(12) United States Patent
Taurasi et al.

(10) Patent No.: US 11,377,883 B2
(45) Date of Patent: Jul. 5, 2022

(54) LATCH ASSEMBLY FOR MOTOR VEHICLE CLOSURE SYSTEM HAVING POWER RELEASE MECHANISM WITH OVERRIDE/RESET

(71) Applicant: MAGNA CLOSURES INC., Newmarket (CA)

(72) Inventors: Marco Taurasi, Leghorn (IT); Dunia Sardelli, Leghorn (IT)

(73) Assignee: MAGNA CLOSURES INC., Newmarket (CA)

( * ) Notice: Subject to any disclaimer, the term of this patent is extended or adjusted under 35 U.S.C. 154(b) by 757 days.

(21) Appl. No.: 16/197,747

(22) Filed: Nov. 21, 2018

(65) Prior Publication Data

US 2019/0161996 A1 May 30, 2019

Related U.S. Application Data

(60) Provisional application No. 62/592,939, filed on Nov. 30, 2017.

(51) Int. Cl.
*E05B 81/90* (2014.01)
*E05B 81/16* (2014.01)
(Continued)

(52) U.S. Cl.
CPC .............. *E05B 81/90* (2013.01); *E05B 81/06* (2013.01); *E05B 81/14* (2013.01); *E05B 81/16* (2013.01);
(Continued)

(58) Field of Classification Search
CPC .......... E05B 81/90; E05B 81/16; E05B 81/34; E05B 81/42; E05B 81/14; E05B 81/06;
(Continued)

(56) References Cited

U.S. PATENT DOCUMENTS 8,136,866 B2 * 3/2012 Broadhead .............. B60R 13/06
296/146.2
9,476,230 B2 * 10/2016 Margheritti ............. E05B 77/16
(Continued)

FOREIGN PATENT DOCUMENTS

| CN | 104937197 A | 9/2015 |
| CN | 106917552 A | 7/2017 |

(Continued)

*Primary Examiner* — Kristina R Fulton
*Assistant Examiner* — Emily G. Brown
(74) *Attorney, Agent, or Firm* — Dickinson Wright PLLC

(57) ABSTRACT

A power closure latch assembly with a manually actuatable release link, vehicle door therewith and method of allowing a power actuatable closure latch assembly to be converted for selective manual actuation is provided. The release link is configured to operably communicate an actuator lever with a release lever for conjoint movement therebetween, to provide power-assisted movement of a pawl between ratchet releasing and ratchet holding positions, when the release link is in a "normal" first operating position. The release link is further configured to allow the release lever to move independently from the actuator lever when the release link is in a manually deployed "override/reset" second position to provide spring-biased movement of the pawl from the ratchet releasing position back to the ratchet holding position.

19 Claims, 23 Drawing Sheets

(51) Int. Cl.
  *E05B 81/36* (2014.01)
  *E05B 81/06* (2014.01)
  *E05B 81/20* (2014.01)
  *E05B 81/34* (2014.01)
  *E05B 81/14* (2014.01)
  *B60J 5/04* (2006.01)

(52) U.S. Cl.
  CPC .............. *E05B 81/20* (2013.01); *E05B 81/34* (2013.01); *E05B 81/36* (2013.01); *B60J 5/047* (2013.01); *E05Y 2900/531* (2013.01)

(58) Field of Classification Search
  CPC ........ E05B 85/20; E05B 85/24; E05B 85/243; E05B 85/26; B60J 5/0413; Y10T 292/1047; Y10T 292/1082; Y10S 292/23; Y10S 292/65
  See application file for complete search history.

(56) References Cited

U.S. PATENT DOCUMENTS

| | | | |
|---|---|---|---|
| 9,938,755 | B2 | 4/2018 | Taurasi et al. |
| 2002/0105192 | A1* | 8/2002 | Perkins .................. E05B 81/14 292/216 |
| 2008/0224482 | A1 | 9/2008 | Cumbo et al. |
| 2009/0160198 | A1* | 6/2009 | Yoda ....................... E05B 81/06 292/201 |
| 2012/0266639 | A1* | 10/2012 | Yamagata ............... E05B 79/08 70/372 |
| 2014/0360235 | A1* | 12/2014 | Taurasi .................. E05B 81/90 70/156 |
| 2016/0362916 | A1* | 12/2016 | Tomaszewski ......... E05B 81/06 |
| 2018/0058112 | A1* | 3/2018 | Okuma .................... E05B 81/06 |
| 2018/0163439 | A1 | 6/2018 | Patane et al. |
| 2018/0355642 | A1 | 12/2018 | Cumbo et al. |
| 2019/0136590 | A1 | 5/2019 | Patane et al. |

FOREIGN PATENT DOCUMENTS

| | | |
|---|---|---|
| CN | 107339029 A | 11/2017 |
| JP | 3316709 B2 | 8/2002 |

* cited by examiner

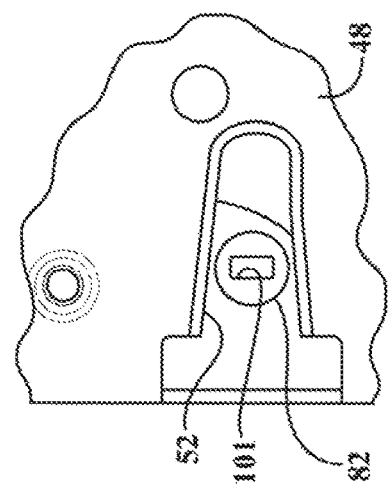
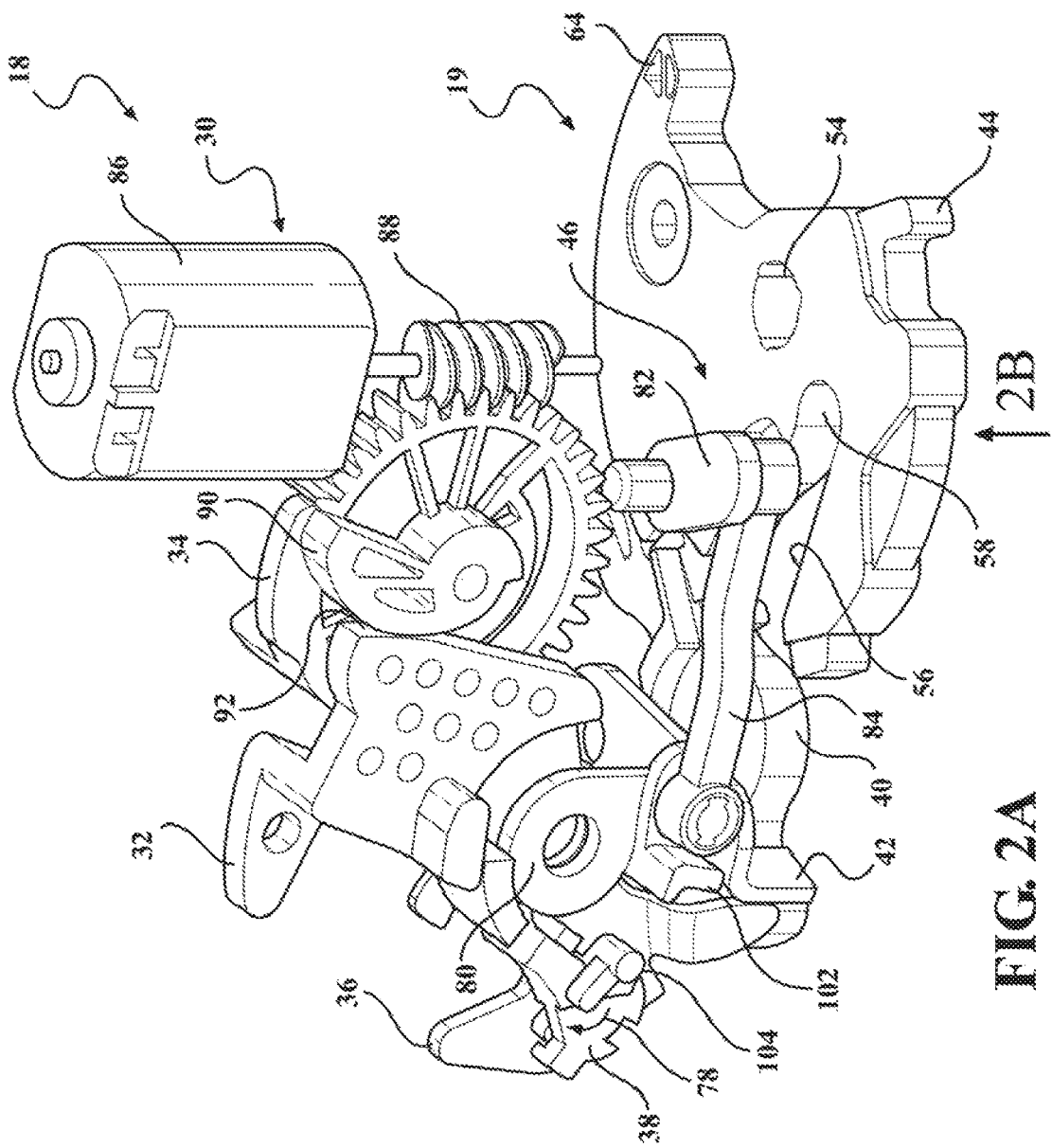

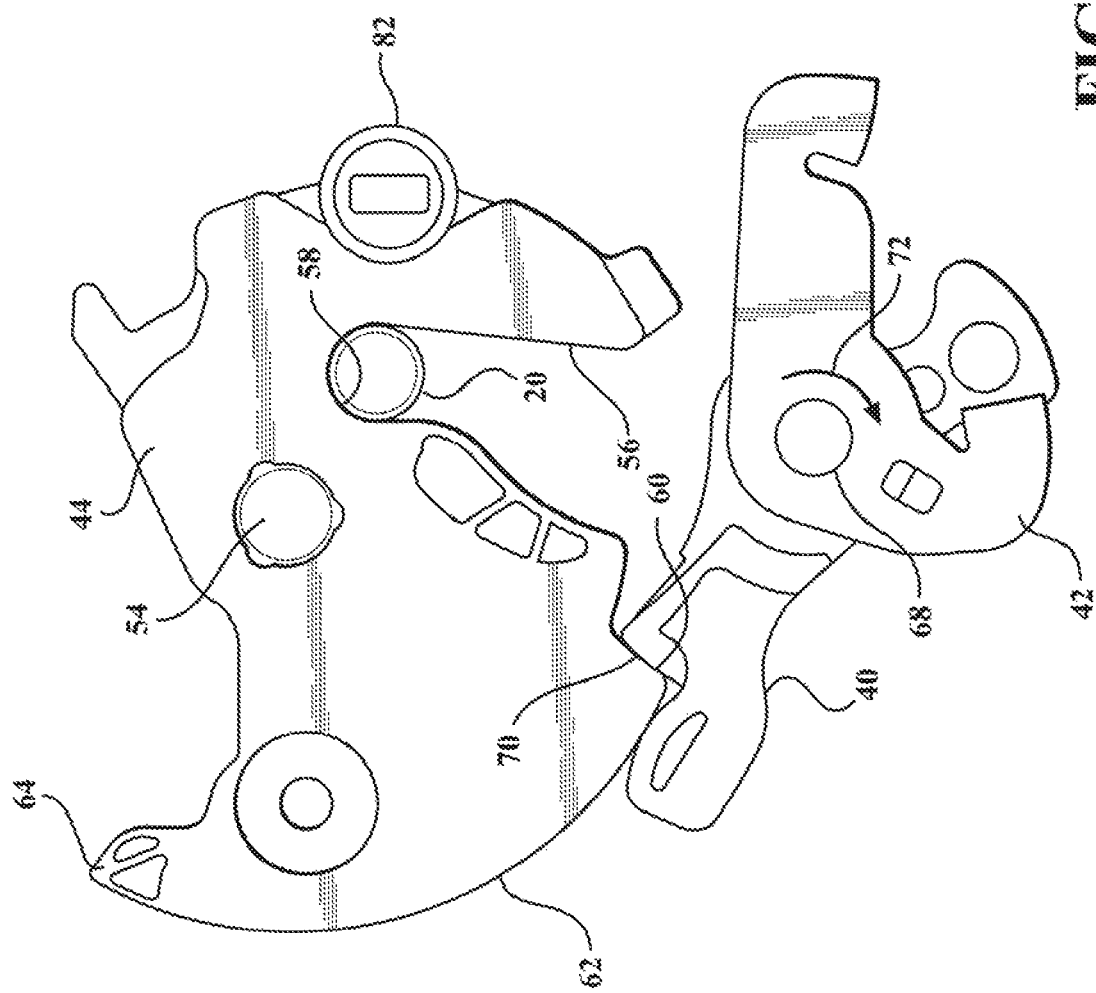

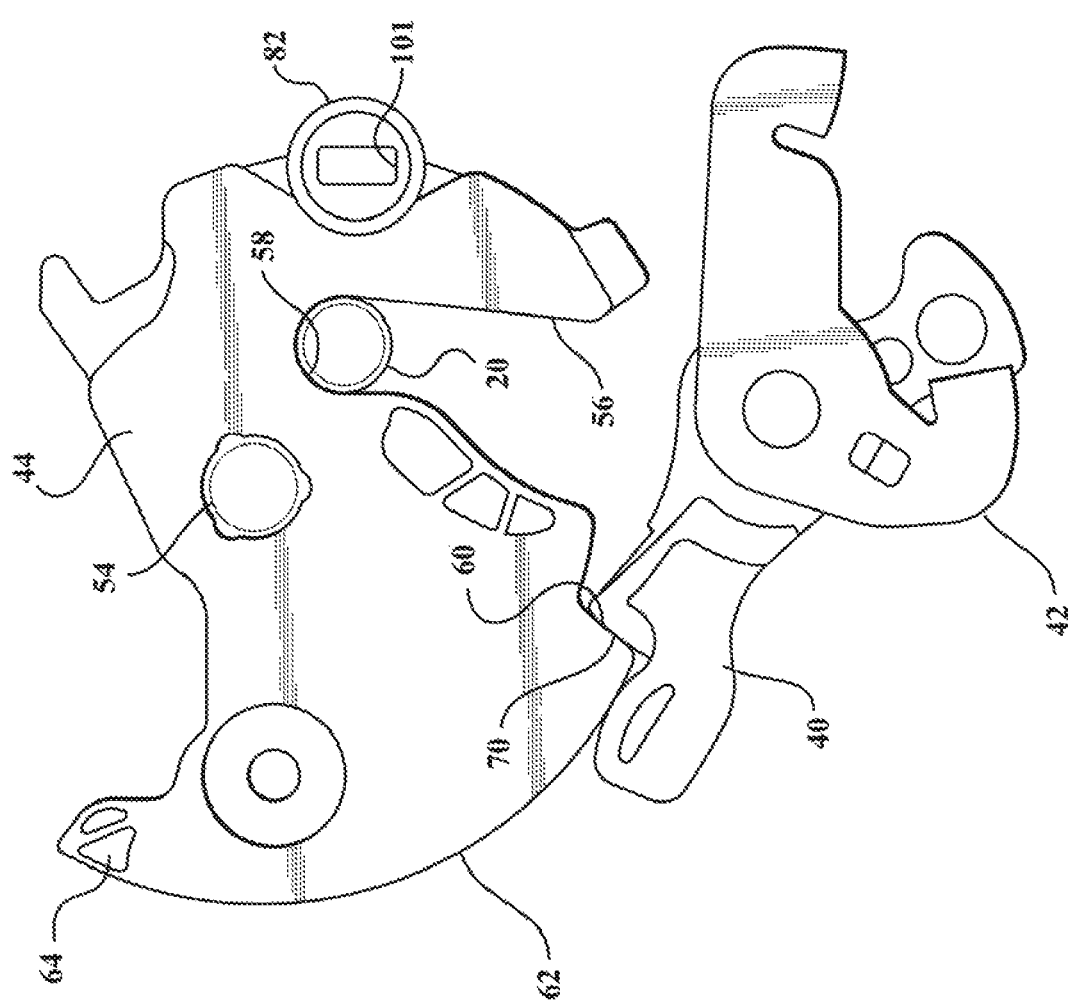

LATCH ASSEMBLY FOR MOTOR VEHICLE CLOSURE SYSTEM HAVING POWER RELEASE MECHANISM WITH OVERRIDE/RESET

CROSS-REFERENCE TO RELATED APPLICATION

This application claims the benefit of U.S. Provisional Application Ser. No. 62/592,939, filed Nov. 30, 2017, which is incorporated herein by reference in its entirety.

FIELD

The present disclosure relates generally to closure latch assemblies of the type used in motor vehicle closure systems for controlling the locking and release of a closure panel. More particularly, the present disclosure relates to a power-operated closure latch assembly providing a power unlatching feature and being equipped with mechanical pawl reset mechanism to restore ratchet retention function.

BACKGROUND

This section provides background information related to the present disclosure which is not necessarily prior art.

In view of increased consumer demand for motor vehicles equipped with advanced comfort and convenience features, many modern motor vehicles are now provided with passive entry systems to permit locking and release of closure panels (i.e., doors, tailgates, liftgates and decklids) without use of a traditional key-type entry system. In this regard, some popular features now available with vehicle latch systems include power locking/unlocking, power release and power cinching. These "powered" features are provided by a power closure latch assembly mounted to the closure panel and which is typically equipped with a ratchet and pawl type of latch mechanism controlled via at least one power-operated actuator. Typically, the closure panel is held in a closed position by virtue of the ratchet being held in a striker capture position to releasably retain a striker that is mounted to a structural body portion of the vehicle. The ratchet is held in its striker capture position by the pawl engaging the ratchet when the pawl is located in a ratchet holding position. In many ratchet and pawl type of latch mechanisms, the pawl is operable in its ratchet holding position to retain the ratchet in one of a secondary or "soft close" striker capture position and a primary or "hard close" striker capture position. When the ratchet is held by the pawl in its secondary striker capture position, the latch mechanism functions to latch the closure panel in a partially-closed position relative to the body portion of the vehicle. Likewise, when the ratchet is held by the pawl in its primary striker capture position, the latch mechanism functions to latch the closure panel in a fully-closed position relative to the body portion of the vehicle.

To release the closure panel from its fully-closed position, a power latch release mechanism is actuated for moving the pawl from its ratchet holding position into a ratchet releasing position, whereby a ratchet biasing arrangement, in cooperation with the seal loads exerted on the striker, act to forcibly pivot the ratchet from its primary striker capture position into a striker release position. With the ratchet located in its striker release position, the latch mechanism unlatches the closure panel for subsequent movement toward its open position. In closure latch assemblies providing a power release feature, the latch release mechanism is typically controlled by a power-operated release actuator.

A problem associated with some power-actuated closure latch assemblies providing an ability to release the closure panel from its fully-closed position can arise if power is interrupted upon moving the pawl from its ratchet holding position into the ratchet releasing position. In such instances of power interruption, the power-actuated component(s) responsible for driving the pawl against a bias of a spring member to the ratchet releasing position are unable to be further actuated as a result of loss of power, and thus, the pawl can be prevented from returning under the bias of the spring member to the ratchet holding position. As such, the closure panel is effectively prevented from being able to be returned to either a secondary or primary striker capture position as long as the pawl remains disengaged from the ratchet in the ratchet releasing position. Accordingly, only upon restoration of power to the latch assembly is the pawl able to be returned to the ratchet holding position, which in turn, will allow the closure panel to be returned to a closed or partially closed position.

Accordingly, while current power closure latch assemblies are sufficient to meet regulatory requirements and provide enhanced comfort and convenience, a need still exists to advance the technology and provide alternative features and arrangements that address and overcome at least some of the shortcomings associated therewith.

SUMMARY

This section provides a general summary of the present disclosure and is not a comprehensive disclosure of its full scope or all of its features, aspects and objectives.

It is an aspect of the present disclosure to provide a power closure latch assembly for a motor vehicle closure system configured to provide a manually actuatable override/reset feature.

It is a related aspect of the present disclosure to provide the power closure latch assembly with a manually actuatable release link configured to operably and selectively communicate an actuator lever with a release lever for conjoint movement of the actuator lever with the release lever, to provide power-assisted movement of a pawl between ratchet releasing and ratchet holding positions, when the release link is in a "normal" first operating position, and to allow the release lever to move independently from the actuator lever when the release link is in a manually deployed "override/reset" second position to provide spring biased movement of the pawl from the ratchet releasing position back to the ratchet holding position.

It is a related aspect of the present disclosure to provide the release link being biased into the "normal" first operating position such that the release link remains in bridging relation between the actuator lever and the release lever until acted on by a selectively, manually applied external force sufficient to overcome the bias.

It is another related aspect of the present disclosure to configure the release link to automatically return to the "normal" first operating position from the "override/reset" second position under the bias of a spring member upon restoration of power to the power closure latch assembly and powered actuation of the power closure latch assembly.

It is another related aspect of the present disclosure to provide the release link being selectively, manually actuatable to move to the "override/reset" second position via selective manual actuation of a lever arm.

It is another related aspect of the present disclosure to configure the manually actuatable override/reset feature for operable movement in response to manual actuation of a vehicle key.

It is another related aspect of the present disclosure to configure the manually actuatable override/reset feature for operable movement in response to manual actuation of a release handle.

It is to be recognized that one possessing ordinary skill in the art will readily appreciate these and further aspects of the power closure latch assembly upon viewing the disclosure herein.

In accordance with these and other aspects, a power closure latch assembly is provided which comprises: a ratchet moveable between a striker release position whereat the ratchet is positioned to release a striker, a striker capture position whereat the ratchet is positioned to retain the striker, the ratchet being biased toward its striker release position. A pawl is provided that is moveable between a ratchet holding position whereat the pawl is positioned to hold the ratchet in its striker capture position and a ratchet releasing position whereat the pawl is located to permit movement of the ratchet to its striker release position, with the pawl being biased toward the ratchet holding position. Further, power closure latch assembly includes a power driven actuator and an actuator lever configured in operable communication with the power driven actuator. A release lever is configured in operable communication with the pawl, with the release lever being biased away from the pawl. A release link is configured to bridge the actuator lever and the release lever to operably communicate the actuator lever with the release lever when the release link is in a "normal" first position to provide conjoint movement between the actuator lever and the release lever and to provide power-assisted movement of the pawl between the ratchet releasing position and the ratchet holding position in response to selective actuation of the power driven actuator, and to allow the release lever to move independently from the actuator lever when the release link is in a manually deployed "override/reset" second position to allow movement of the pawl from the ratchet releasing position back to the ratchet holding position.

In accordance with a further aspect, a release lever link spring member can bias the release lever link toward the "normal" first position, thereby facilitating return to normal, power actuated use upon restoration of power to the power driven actuator.

In accordance with a further aspect, a backup release lever can be configured in operable communication with the release lever link to move the release lever link from the "normal" first position to the "override/reset" second position.

In accordance with a further aspect, the backup release lever can be configured for manual actuation independent from the power driven actuator to move the release lever link from the "normal" first position to the "override/reset" second position via a vehicle key, such as during a power interruption to the power driven actuator.

In accordance with a further aspect, a backup actuation lever can be operably coupled to the backup release lever, with the backup actuation lever being configured for receipt of the vehicle key and for rotation in response to rotation of the vehicle key, wherein rotation of the backup actuation lever causes pivotal movement of the backup release lever into abutment with the release lever link to move the release lever link from the "normal" first position to the "override/reset" second position.

In accordance with a further aspect, a link arm can be provided to extend between the backup release lever and the backup actuation lever, with the link arm being pivotably coupled to the backup release lever to move the release lever link against the bias of the release link spring member from the "normal" first position to the "override/reset" second position in response to rotation of the vehicle key.

In accordance with a further aspect, the backup release lever can be supported for pivotal movement on the actuator lever.

In accordance with a further aspect, the link arm can be configured for linear movement to cause the pivotal movement of the backup release lever in response to rotation of the vehicle key.

In accordance with a further aspect, a closure panel for a motor vehicle is provided. The closure panel has an outer panel and an inner panel with a shut face extending therebetween, with a power closure latch assembly mounted along the shut face. The power closure latch assembly includes a ratchet moveable between a striker release position whereat the ratchet is positioned to release a striker to allow the closure panel to be opened, a striker capture position whereat the ratchet is positioned to retain the striker to maintain the closure panel in a closed position, wherein the ratchet is biased toward its striker release position. A pawl is provided that is moveable between a ratchet holding position whereat the pawl is positioned to hold the ratchet in its striker capture position and a ratchet releasing position whereat the pawl is located to permit movement of the ratchet to its striker release position, with the pawl being biased toward the ratchet holding position. Further, power closure latch assembly includes a power driven actuator and an actuator lever configured in operable communication with the power driven actuator. A release lever is configured in operable communication with the pawl, with the release lever being biased away from the pawl. A release link is configured to bridge the actuator lever and the release lever to operably communicate the actuator lever with the release lever when the release link is in a "normal" first position to provide concurrent movement between the actuator lever and the release lever and to provide power-assisted movement of the pawl between the ratchet releasing position and the ratchet holding position in response to selective actuation of the power driven actuator, and to allow the release lever to move independently from the actuator lever when the release link is in a manually deployed "override/reset" second position to allow movement of the pawl from the ratchet releasing position back to the ratchet holding position.

In accordance with a further aspect, the release link can be manually deployed to the "override/reset" second position via a vehicle key being inserted through an aperture in the end face and rotated.

In accordance with a further aspect, a method of providing for a power actuatable closure latch assembly to be converted for selective manual actuation is provided. The method includes: providing a ratchet being moveable between a striker release position and a striker capture position; providing a pawl being moveable between a ratchet holding position to hold the ratchet in the striker capture position and a ratchet releasing position to permit movement of the ratchet to the striker release position; providing a power driven actuator; providing an actuator lever configured in operable communication with the power driven actuator; providing a release lever configured in operable communication with the pawl; and providing a release lever link operably communicating the actuator lever with the release lever when the release lever link is in a "normal" first position to provide concurrent movement between the actuator lever and the release lever and to provide power-assisted movement of the pawl between the ratchet holding position and the ratchet releasing position in response to selective actuation of the power driven actuator, and to allow the release lever link to be manually deployed to an "override/reset" second position whereat the release lever link is moved out of communication between the actuator lever and the release lever to allow the release lever to move independently from the actuator lever, thereby allowing the pawl to move under manual actuation from the ratchet releasing position back to the ratchet holding position.

In accordance with a further aspect, the method can further include providing a backup actuation lever operably coupled to the release lever link and configuring the backup actuation lever for receipt of a vehicle key such that rotation of the vehicle key causes the release lever link to move from the "normal" first position to the "override/reset" second position.

In accordance with a further aspect, the method can further include biasing the release lever link toward the "normal" first position to allow the release lever link to be automatically returned to the "normal" first position from the "override/reset" second position upon power being restored to the power actuated latch assembly.

Further areas of applicability will become apparent from the detailed description provided herein. The description and specific examples in this summary are intended for purposes of illustration only and are not intended to limit the scope of the present disclosure.

DRAWINGS

Other objects, features and advantages of the present disclosure will be readily appreciated, as the same becomes better understood by reference to the following detailed description when considered in connection with the accompanying drawings wherein:

FIG. 2A is a view similar to FIG. 2 with the striker removed therefrom for further clarity;

FIG. 2B is a view looking generally along the direction of arrow 2B of FIG. 2A;

FIG. 5A is a partial cross-sectional, elevational view of components of the assembly as shown in FIG. 5;

FIG. 10A is a partial cross-sectional, elevational view of components of the assembly as shown in FIG. 5;

Figure 1:
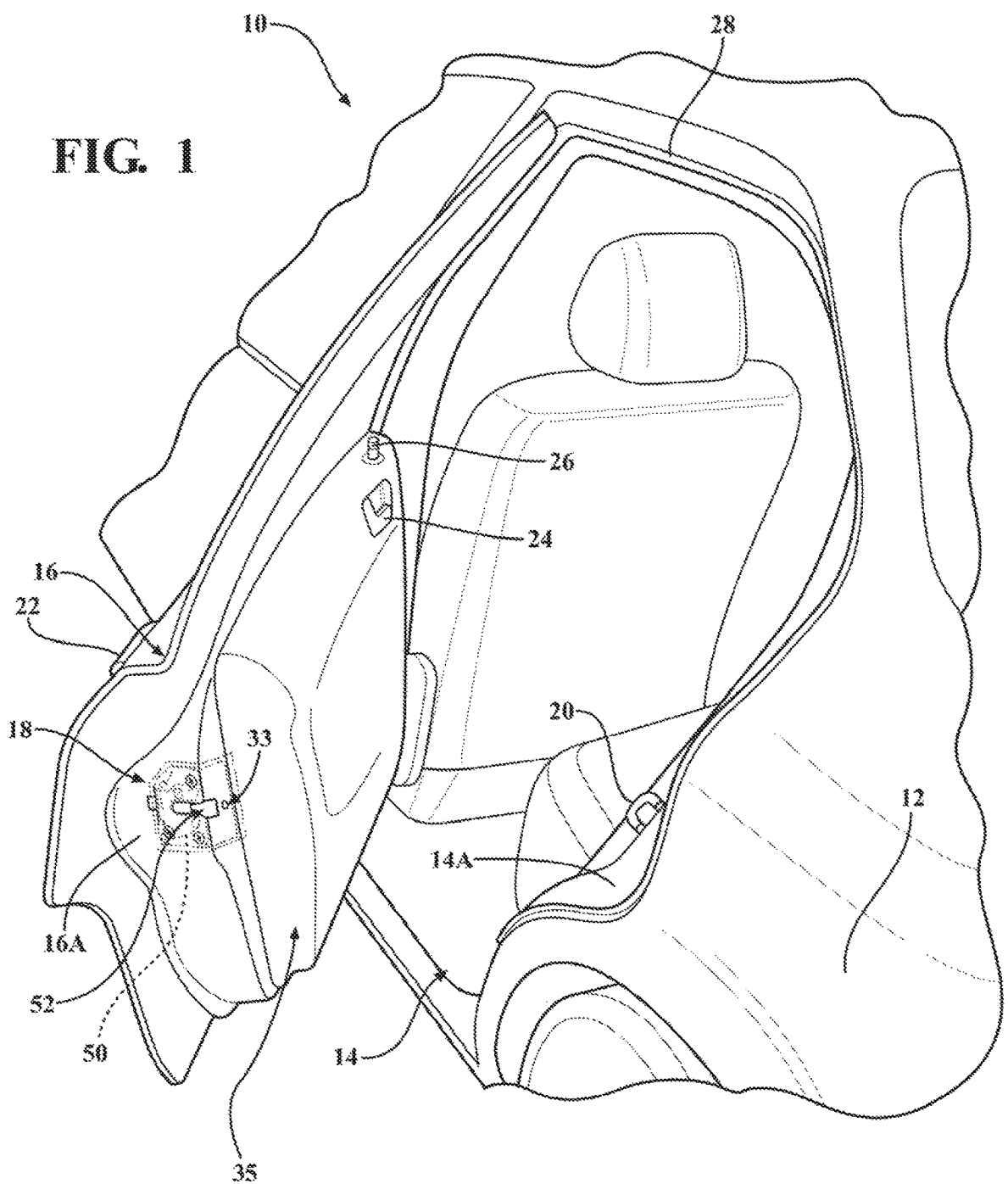
FIG. 1 is a partial perspective view of a motor vehicle having a closure panel equipped with a power closure latch assembly that is constructed in accordance with the teachings of the present disclosure.
Figure 14:
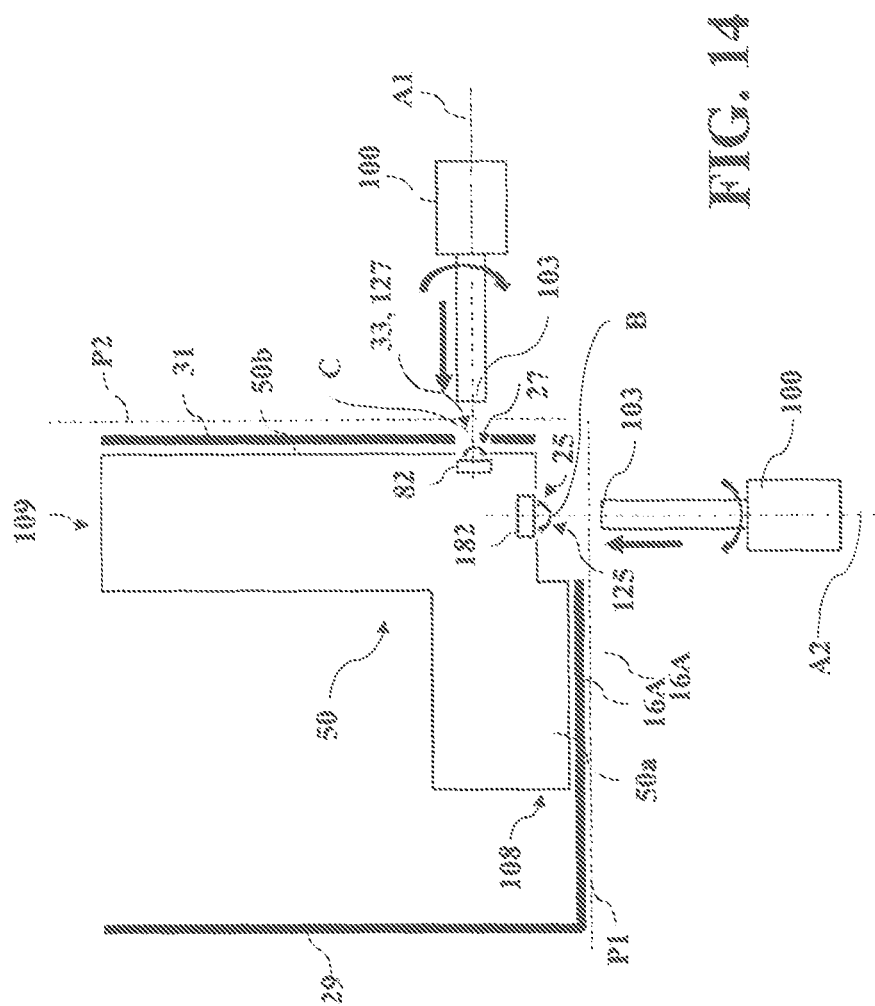
Figure 15:
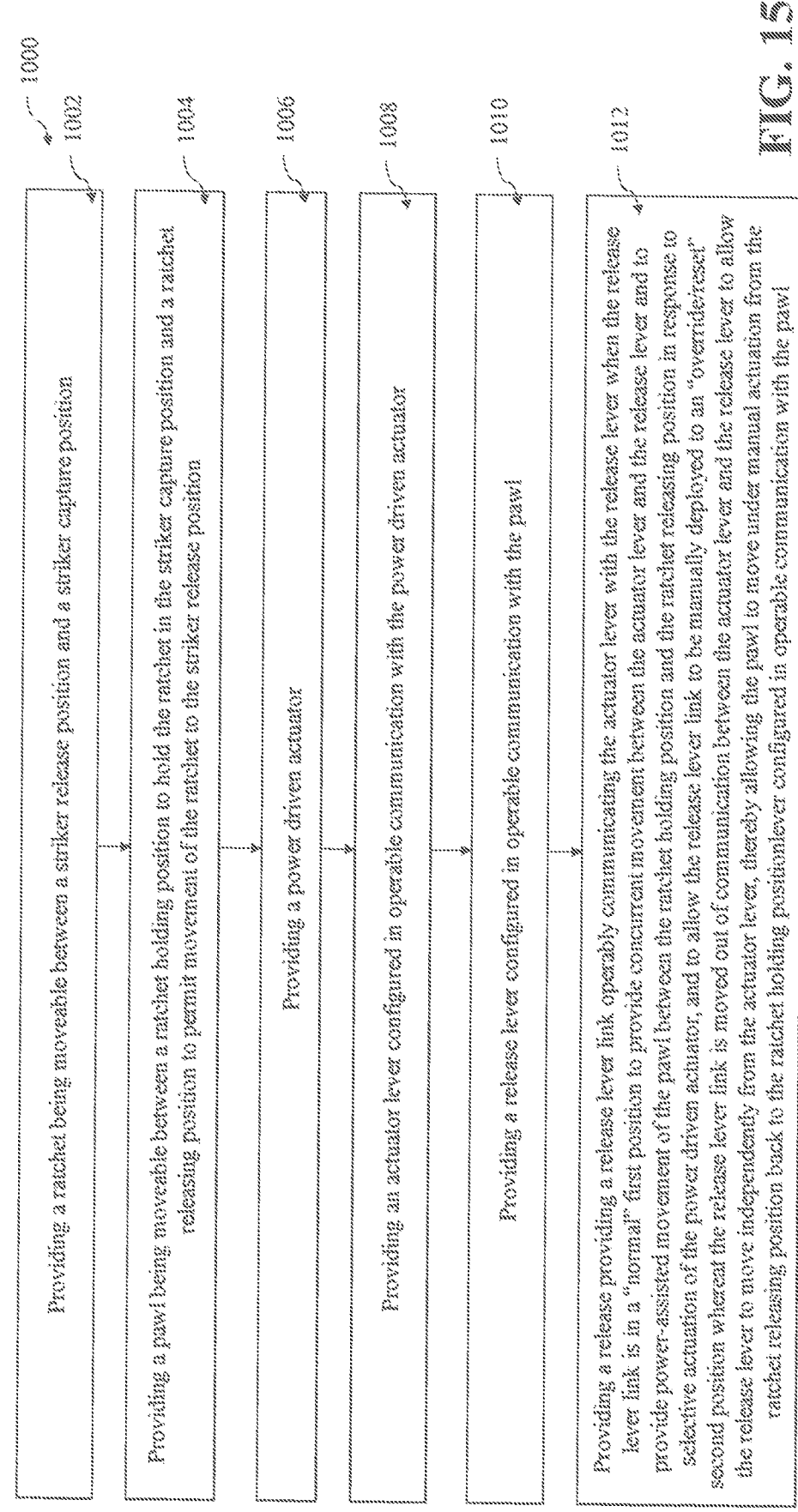

FIG. 14 is a diagrammatic top view of the power closure latch assembly of FIG. 1 mounted to the inner panel and shut face, in accordance with an illustrative embodiment; and FIG. 15 is a flow chart illustrating a method of allowing a power actuatable closure latch assembly to be converted for selective manual actuation during a power interruption to the power actuated latch assembly, in accordance with an illustrative embodiment

DETAILED DESCRIPTION

An example embodiment of a closure panel and power closure latch assembly therefor for use in a motor vehicle closure system will now be described more fully with reference to the accompanying drawings. To this end, the example embodiment of the power closure latch assembly is provided so that this disclosure will be thorough, and will fully convey its intended scope to those who are skilled in the art. Accordingly, numerous specific details are set forth such as examples of specific components, devices, and methods, to provide a thorough understanding of a particular embodiment of the present disclosure. However, it will be apparent to those skilled in the art that specific details need not be employed, that the example embodiment may be embodied in many different forms, and that the example embodiment should not be construed to limit the scope of the present disclosure. In some parts of the example embodiment, well-known processes, well-known device structures, and well-known technologies are not described in detail.

In the following detailed description, the expression "power closure latch assembly" will be used to generally indicate any power-operated latch device adapted for use with a vehicle closure panel. Additionally, the expression "closure panel" will be used to indicate any element mounted to a vehicle body portion of a motor vehicle and moveable between an open position and at least one closed position, respectively opening and closing an access to an inner compartment of the motor vehicle, and therefore includes, without limitations, decklids, tailgates, liftgates, bonnet lids, and sunroofs in addition to the sliding or pivoting passenger doors of the motor vehicle to which the following description will make explicit reference, purely by way of example.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Referring initially to FIG. 1 of the drawings, a motor vehicle 10 is shown to include a vehicle body 12 defining an opening 14 to an interior passenger compartment. A closure panel 16, for example a vehicle door 16, is illustratively shown pivotably mounted to vehicle body 12 for movement between an open position (shown) and a fully-closed position to respectively open and close opening 14. A power closure latch assembly 18 is shown secured to closure panel 16 adjacent to an edge portion 16A, also referred to as "shut face" extending between inner panel 31 and outer panel 29, thereof and includes a latch mechanism 19 that is releasably engageable with a striker 20 fixedly secured to a recessed edge portion 14A of opening 14. As will be detailed, power closure latch assembly 18 is operable to engage striker 20 and releasably hold closure panel 16 in its fully-closed position. An outside handle 22 and an inside handle 24 are provided for selectively actuating the latch mechanism 19 of power closure latch assembly 18 to release striker 20 from the latch mechanism and permit subsequent movement of closure panel 16 to its open position. An optional lock knob 26 provides a visual indication of the locked state of power closure latch assembly 18 and which may also be operable to mechanically change the locked/unlocked state of power closure latch assembly 18. A weather seal 28 is mounted on edge portion 14A of opening 14 in vehicle body 12 and is adapted to be resiliently compressed upon engagement with a mating sealing surface of closure panel 16 when closure panel 16 is held by the latch mechanism 19 of power closure latch assembly 18 in its fully-closed position so as to provide a sealed interface therebetween which is configured to prevent entry of rain and dirt into the passenger compartment while minimizing audible wind noise. For purpose of clarity and functional association with motor vehicle 10, the closure panel is hereinafter referred to as vehicle door 16.

A detailed description of a non-limiting example of power closure latch assembly 18, constructed in accordance with the teachings of the present disclosure, will now be provided. In general, power closure latch assembly 18 includes a power release actuator 30, an actuator lever 32, a gear 34 operably connecting the power release actuator 30 to the actuator lever 32, a release lever 36, a release lever link 38 bridging and operably connecting the actuator lever 32 to the release lever 36, a pawl 40, a pawl lever 42 operably connecting the release lever 36 to the pawl 40, a ratchet 44 configured for selective locked engagement with the pawl 40 and for selective locked engagement with the striker 20 when the closure panel 16 is in a closed position, and a manually actuatable override/reset feature or mechanism shown generally at 46. It will be readily appreciate by one skilled in the art that the above components can be mounted to and within a housing, sometimes referred to as frame plate 48, suitably shaped for the intended vehicle application, with a housing cover or frame plate cover 50 supporting and enclosing the above-noted mechanisms and power actuators. Housing cover 50 illustratively includes a first body 108 configured for mounting along side the inner surface of the shut face 16A, (e.g. housing cover portion 50a is positioned adjacent the shut face 16A), and a second body 109 configured for mounting along side the inner surface of inner panel 31 (e.g. housing cover portion 50b is positioned adjacent the shut face 16A). Bodies 108, 109 are arranged transversally, or substantially perpendicular, to one another, so as to define an L-shaped configuration of frame plate 48 when viewed along a plane perpendicular to both the bodies 108, 109 (e.g. see FIG. 14). In particular, body 108 is substantially plate-shaped and carries latch pawl lever 42, the pawl 40, and the ratchet 44, whilst body 109 is a casing internally housing power release actuator 30, an actuator lever 32, gear 34, release lever 36, and a release lever link 38 in accordance with the exemplary embodiment. It is recognized that the components of power closure latch assembly 18 may be distributed within bodies 108, 109 differently, so as to form a power release chain sequentially connecting the power release actuator 30 with the pawl 40. While illustratively the power release chain is shown as forming a sequence of activatable elements including actuator lever 32, gear 34, release lever 36, release lever link 38, latch pawl lever 42, for imparting a movement of pawl 40 in response to the activation of power release actuator 30, other intervening components interconnecting such elements together in the sequence chain may be provided. Plate-shaped body 108 extends parallel to a first plane P1, configured to be secured to and flush against the shut face 16A. Body 109 is positioned parallel to a second plane P2, transversal to plane P1; in particular, planes P1 and P2 are substantially orthogonal and, in the example shown, form an angle slightly exceeding 90° (see FIG. 14). Body 109 may also be configured to be secured to the inner panel 31, such that second plane P2 is positioned adjacent the inner panel 31.

Frame plate 48 is a rigid component, shown in the non-limiting embodiment as being configured to be fixedly secured to edge portion 16A of vehicle door 16 and which defines an entry aperture 52, known as a fishmouth, through which striker 20 travels upon movement of vehicle door 16 relative to vehicle body 12. Latch mechanism 19 is shown, in this non-limiting example, as a single ratchet and pawl arrangement including the ratchet 44 and pawl 40. Ratchet 44 is supported for rotational movement relative to frame plate 48 via a ratchet pivot pin 54. Ratchet 44 is configured to include a contoured guide channel 56 which terminates in a striker capture pocket 58, a closing notch 60, and a cam surface 62 extending between closing notch 60 and a nose-shaped terminal end segment 64. A ratchet biasing member, schematically shown by arrow 66, is adapted to normally bias ratchet 44 to rotate about ratchet pivot pin 54 in a first, opening or "releasing" direction (i.e. counterclockwise in FIGS. 2, 6A). As will be detailed, ratchet 44 is moveable through a range of motion between its striker release position and a striker capture (i.e. the "hard closed") position, with intermediate positions (i.e. the "soft closed" position) contemplated herein.

Figure 6:
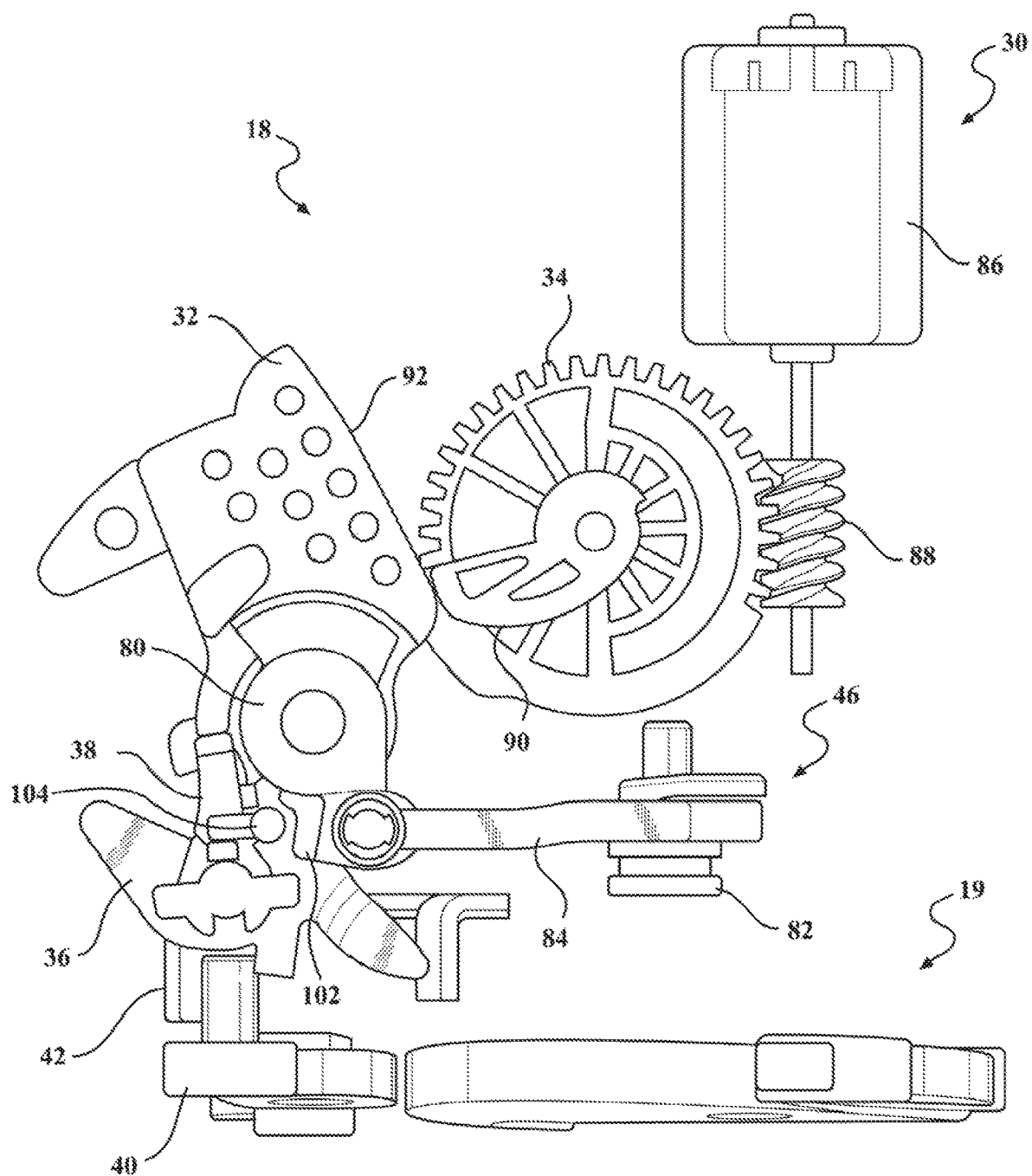
FIG. 6 is a side view of the power closure latch assembly of FIG. 2A shown in a door open, power actuator release and striker release position.
Figure 7:
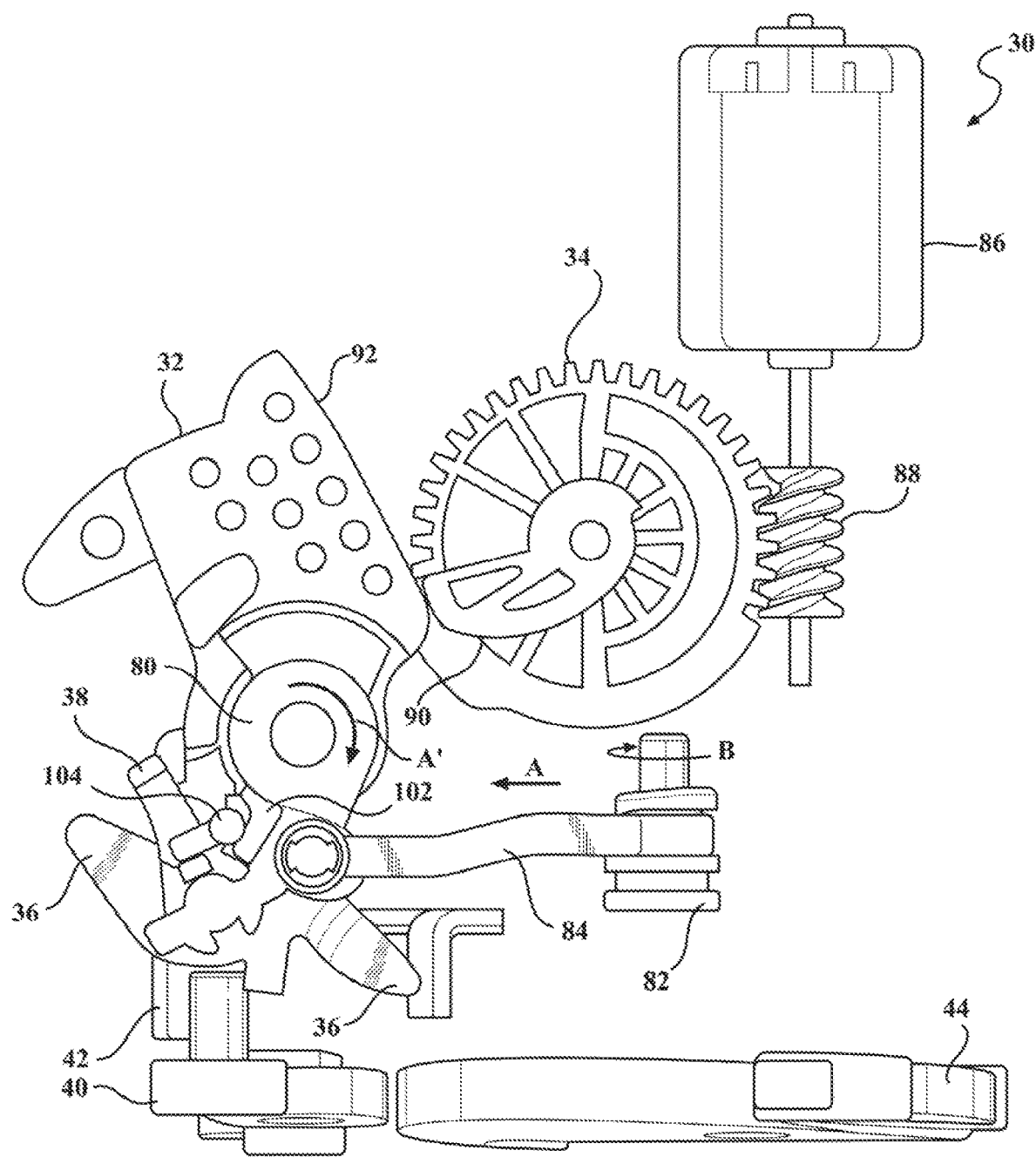
FIG. 7 is a side view of the power closure latch assembly of FIG. 2A shown in a power loss, door open, power actuator release and striker release position with a manually actuatable override/reset feature of the assembly shown in an activated override/reset state.
Figure 8:
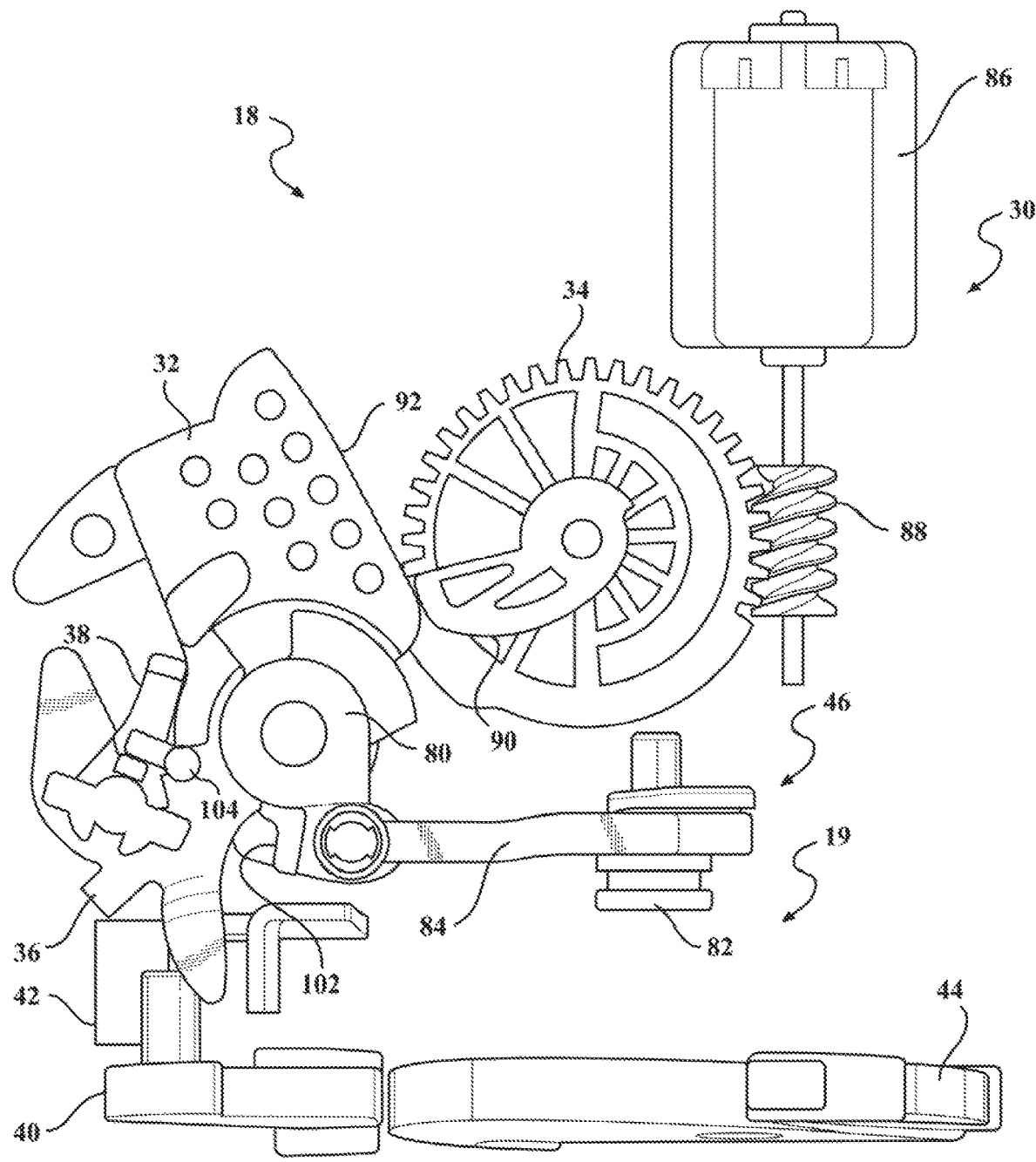
FIG. 8 is a side view of the power closure latch assembly of FIG. 2A shown in the power loss, door open, power actuator release and striker release position with the release lever and pawl lever shown freely biased back to a rest position with the manually actuatable override/reset feature shown returned to a deactivated rest state.

Pawl 40 is supported for rotational movement relative to a pawl pivot pin 68 extending from frame plate 48. Pawl 40 is configured to include a body segment having a latch shoulder 70 that is adapted to ride against cam surface 62 of ratchet 44 in response to movement of ratchet 44 between its striker capture and striker release positions. Latch shoulder 70 on pawl 40 is also configured to engage closing notch 60 when ratchet 44 is located in its striker capture position. A pawl biasing member, schematically illustrated by arrow 72, is provided for normally biasing pawl 40 in a first rotary direction (i.e. clockwise in FIG. 5A) toward its ratchet holding position. Pawl 40 is shown in FIGS. 2-5A and 9-10A located in its ratchet holding position and is shown in FIGS. 6-8 located in its ratchet releasing position.

Figure 2:
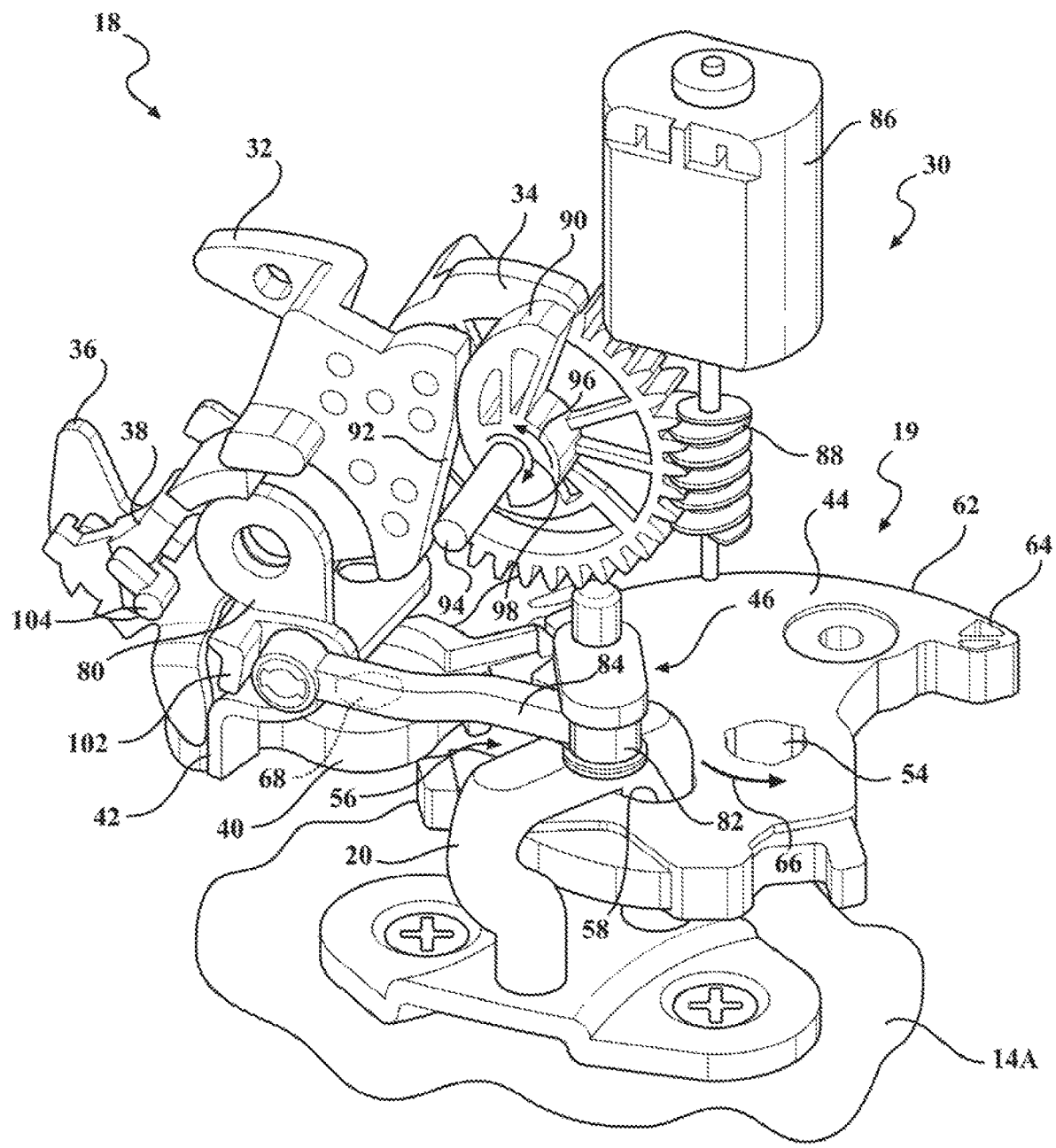
FIG. 2 is an isometric view of the power closure latch assembly in accordance with one aspect of the present disclosure generally illustrating the components of the assembly with a ratchet thereof shown in a door closed, striker capture position in latched engagement with a striker of the motor vehicle.
Figure 3:
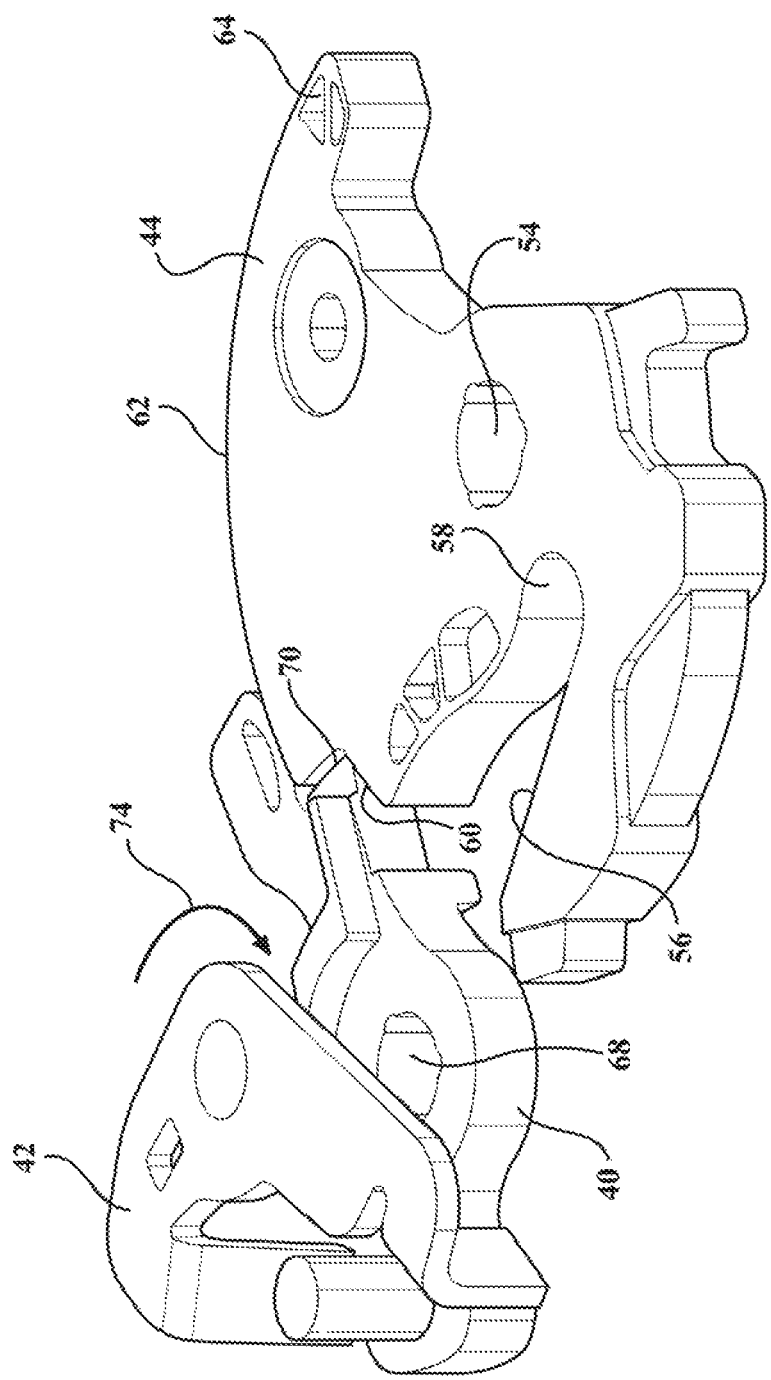
FIG. 3 is another perspective view of a pawl lever, a pawl and a ratchet of the power closure latch assembly shown in FIG. 2.
Figure 4:
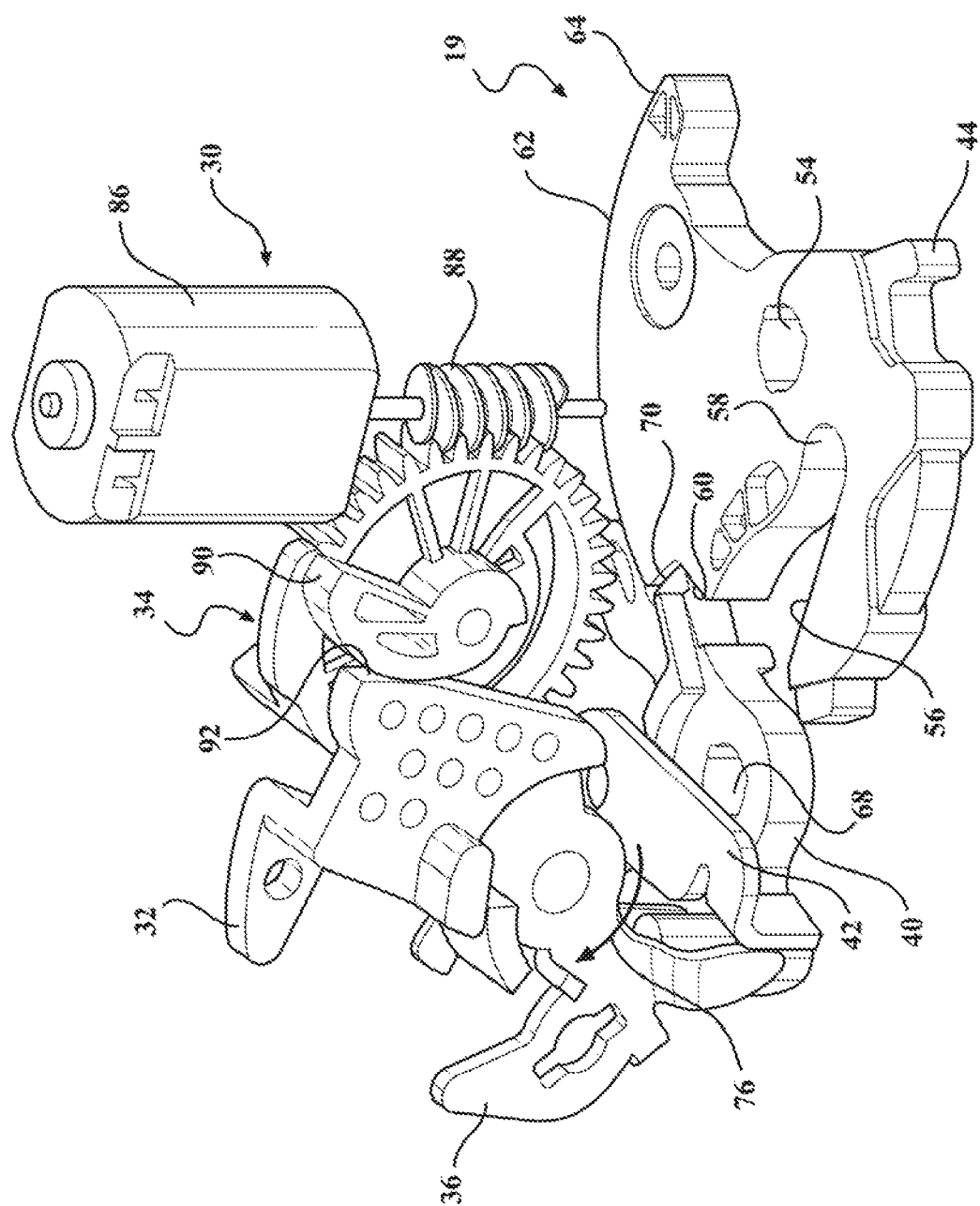
FIG. 4 is an isometric view of the power closure latch assembly of FIG. 2 similar to FIG. 2A with a manually actuatable override/reset feature thereof removed for further clarity of remaining components of the assembly.

Further biasing members include a pawl lever biasing member, schematically illustrated by arrow 74, is provided for normally biasing pawl lever 42 in a first rotary direction (i.e. clockwise in FIG. 3). A release lever biasing member, schematically illustrated by arrow 76, is provided for normally biasing release lever 36 in a first rotary direction (i.e. clockwise in FIG. 4). A release lever link biasing member, schematically illustrated by arrow 78, is provided for normally biasing release lever link 38 in a first rotary direction (i.e. clockwise in FIG. 2A) such that the release lever link 38 is biased to remain in bridging relation between the actuator lever 32 and the release lever 36, thereby bring the actuator lever 32 and the release lever 36 into operable communication with one another.

In accordance with a non-limiting aspect, the manually actuatable override/reset feature 46 is shown having backup release lever 80, a backup knob, also referred to as backup actuation lever 82, and a backup link, also referred to as backup link arm 84, wherein the backup link arm 84 interconnects the backup actuation lever 82 to the backup release lever 80 for operable communication therebetween, such that the backup actuation lever 82 is ultimately brought into operable communication with the release lever link 38, as discussed further below. The manually actuatable override/reset feature 46 provides an ability to override and reset the power closure latch assembly 18 in the event of power interruption, during any operational state of the power closure latch assembly 18, thereby allowing the vehicle closure panel 16 to be returned from the open, unlatched position to the closed, latched position, as is discussed in more detail hereafter. While reference is made herein to the manually actuatable override/reset feature 46 providing an ability to override and reset the power closure latch assembly 18 in the event of power interruption, other conditions preventing the reset of the power closure latch assembly 18, such as a failure in the motor 86, may be overcome with the manually actuatable override/reset feature 46.

The power release actuator 30, by way of example and without limitation, is shown as including a selectively actuatable electric motor 86 having a drive shaft, shown as a drive worm shaft, also referred to as worm gear 88, configured for meshed, driving engagement with the gear 34. The gear 34 is support for selective rotation about a gear shaft 94 in response to actuation of the motor 86, with the gear 34 having a cam lobe 90 configured for driving engagement with a cam surface 92 on the actuator lever 32. As such, when the electric motor 86 drives the drive worm shaft 88 in a first direction, the drive worm shaft 88 causes the gear 34 and cam lobe 90 fixed thereto to rotate in a first unlocking, release direction 96, and when the electric motor 86 drives the drive worm shaft 88 in a second direction opposite the first direction, the drive worm shaft 88 causes the gear 34 and cam lobe 90 fixed thereto to rotate in a second locking or latching direction 98 (FIG. 2).

In normal use, under fully functional electrical operation, the release lever link 38 is configured to operably communicate the actuator lever 32 with the release lever 36 when the release lever link 38 is in a "normal" first position, bridging the actuator lever 32 and the release lever 36. In direct response to movement of the cam lobe 90 rotating in biased engagement with the cam surface 92, the release lever link 38 provides conjoint and concurrent movement between the actuator lever 32 and the release lever 36 to provide electrically power-assisted movement of the pawl 40 between the ratchet holding position and the releasing position in response to selective actuation of the power release actuator 30. On the other hand, during a power out or power interruption condition, when the electric motor 86 is unable to be powered, selective manual actuation of the backup actuation lever 82 causes the backup link arm 84 and backup release lever 80 to pivot the release lever link 38 out of bridging relation and out of operable communication from between the actuator lever 32 and the release lever 36 to an "override/reset" second position to allow the release lever 36 to move independently from the actuator lever 32, which remains fixed, which in turn allows return movement of the release lever 36 and pawl 40 from the ratchet releasing position back to the ratchet holding position, thereby allowing the ratchet 44 to be maintained in the striker capture position by pawl 40 and the vehicle closure panel 16 to be locked in the closed position in the absence of power to the power closure latch assembly 18.

Figure 5:
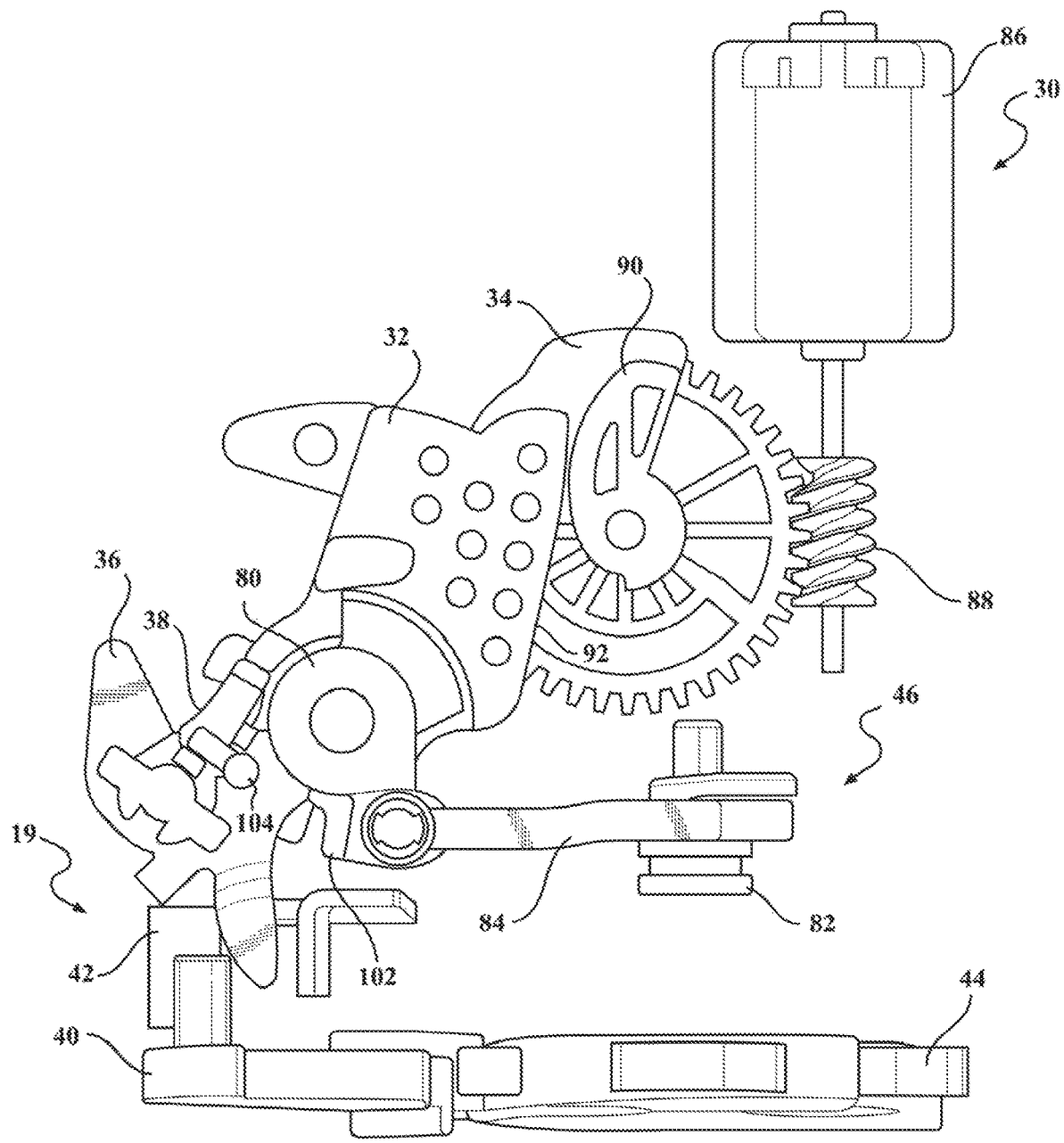
FIG. 5 is a side view of the power closure latch assembly of FIG. 2A shown in the door closed, striker capture position.
Figure 6A:
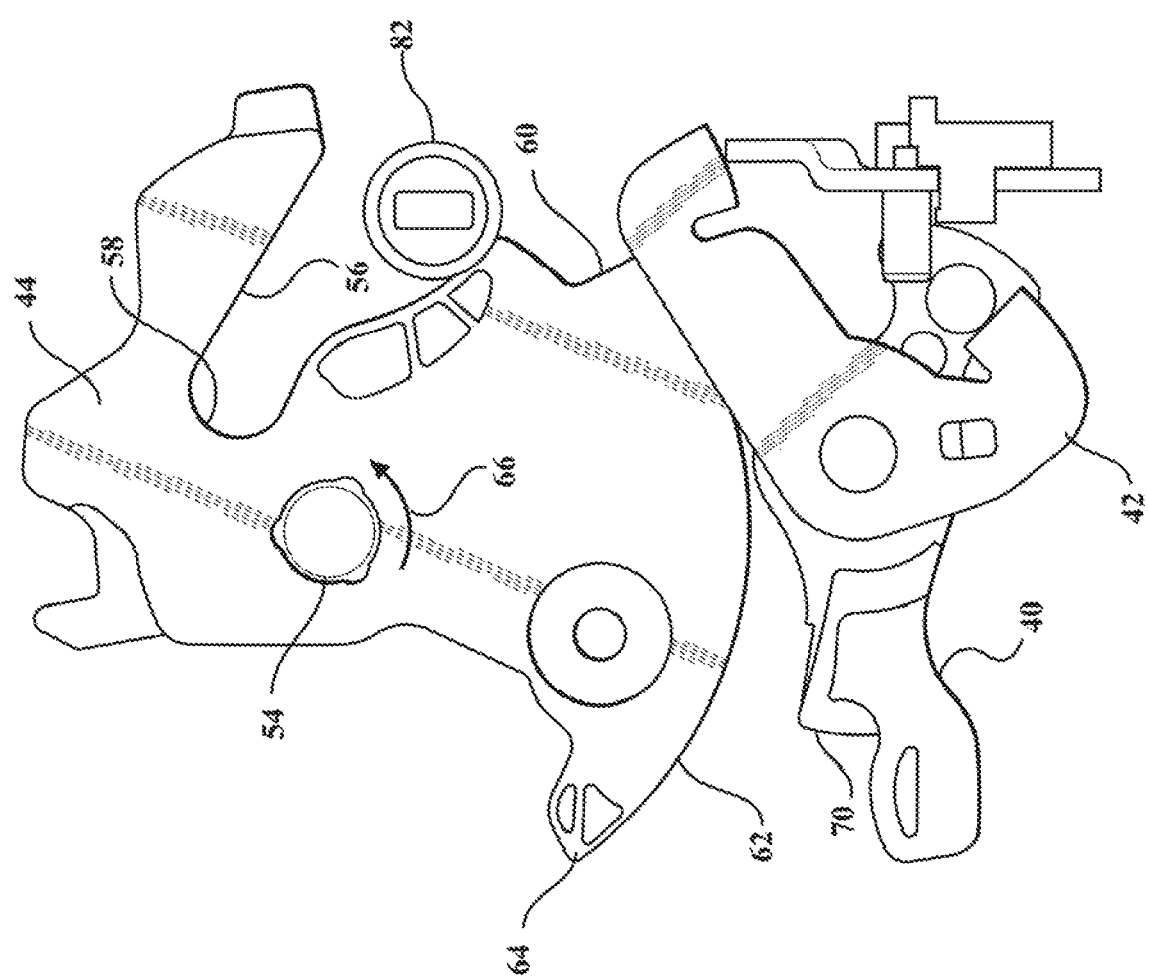
FIG. 6A is a partial cross-sectional, elevational view of components of the assembly as shown in FIG. 6.

In reference to the FIGS., in FIGS. 5 and 5A, the power closure latch assembly 18 and latch mechanism 19 thereof are shown in a fully functional, door closed, power release actuator rest state. Accordingly, the ratchet 44 is in the striker capture, "hard closed") position with the striker 20 shown received therein (FIG. 5A). Further, in this state, the release lever link 38 remains biased via the biasing member 78 into bridging relation between the actuator lever 32 and the release lever 36. As such, as shown in FIGS. 6 and 6A, upon selective, intentional actuation of the power release actuator 30, the drive worm shaft 88 causes the gear 34 and cam lobe 90 to rotate conjointly in the counterclockwise first unlocking, release direction 96, thereby driving the chain of components including the actuator lever 32, release lever link 38, release lever 36, pawl lever 42 and pawl 40, such that the latch shoulder 70 of the pawl 40 is pivoted outwardly and out of engagement from the closing notch 60 of the ratchet 44. Accordingly, the ratchet 44 rotates freely under the bias of the ratchet biasing member 66 to the striker release position, whereupon the vehicle closure panel 16 is free to be opened. As best seen in FIG. 6A, while in this state, the pawl 40, including the latch shoulder 70, are maintained in biased relation out of contact from the ratchet 44 and cam surface 62 thereof. Accordingly, in this state, if the closure panel 16 is moved into a closed position, the ratchet 44 will not be able to locked in the striker capture, "hard closed") position by the pawl 40, and thus, the closure panel 16 will be unable to remain in the closed position. As such, if power is interrupted to the motor 86 of the power release actuator 30, absent the override/reset feature 46, the vehicle closure panel 16 could not be secured in a closed state until power is restored to the motor 86. It is to be recognized that under a normal, fully operational powered condition, upon selectively actuating the power release actuator 30 to allow the ratchet 44 to move to the striker release position, the power release actuator 30 will then reverse drive directions of the drive worm shaft 88, which then causes the gear 34 and cam lobe 90 thereof to rotate in the second locking or latching direction 98, which allows the latch shoulder 70 of pawl 40 to move into biased abutment with the cam surface 62 of ratchet 44.

Figure 7A:
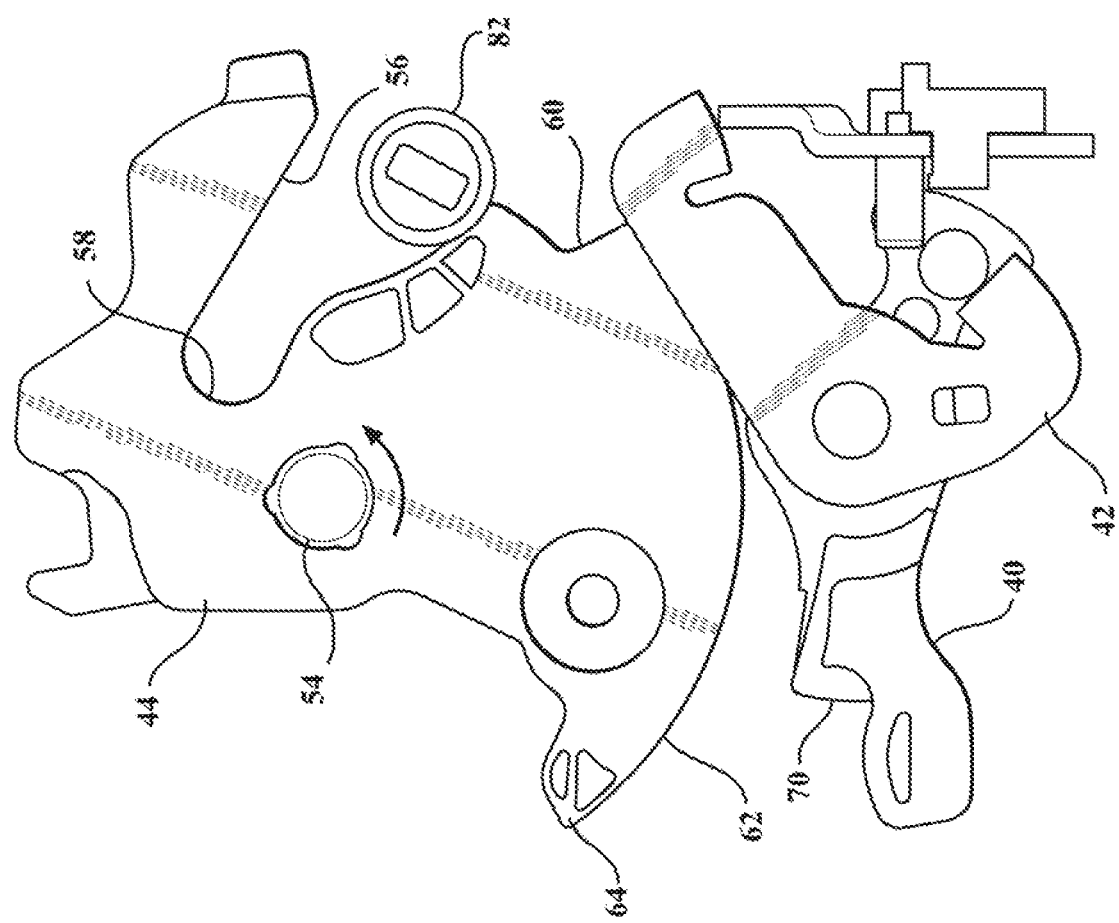
FIG. 7A is a partial cross-sectional, elevational view of components of the assembly as shown in FIG. 7.
Figure 8A:
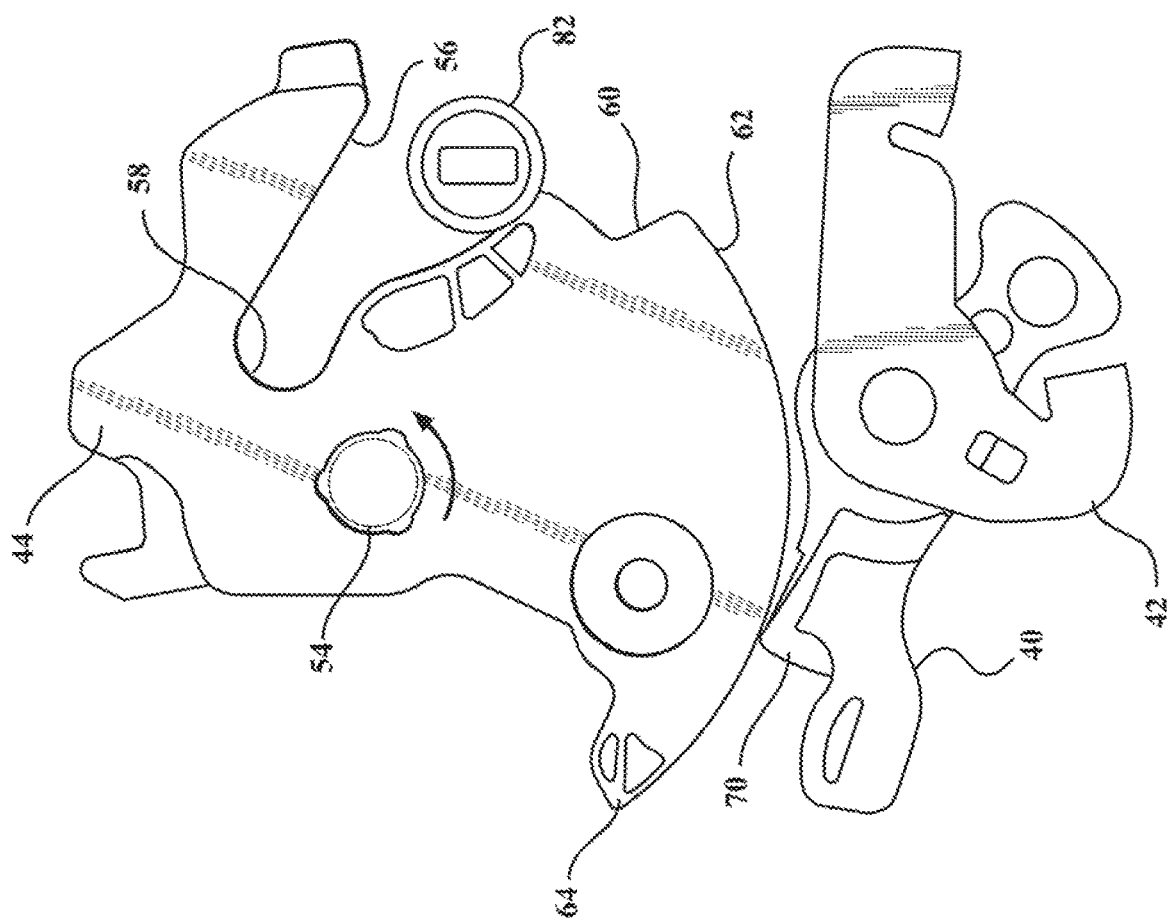
FIG. 8A is a partial cross-sectional, elevational view of components of the assembly as shown in FIG. 8.
Figure 9:
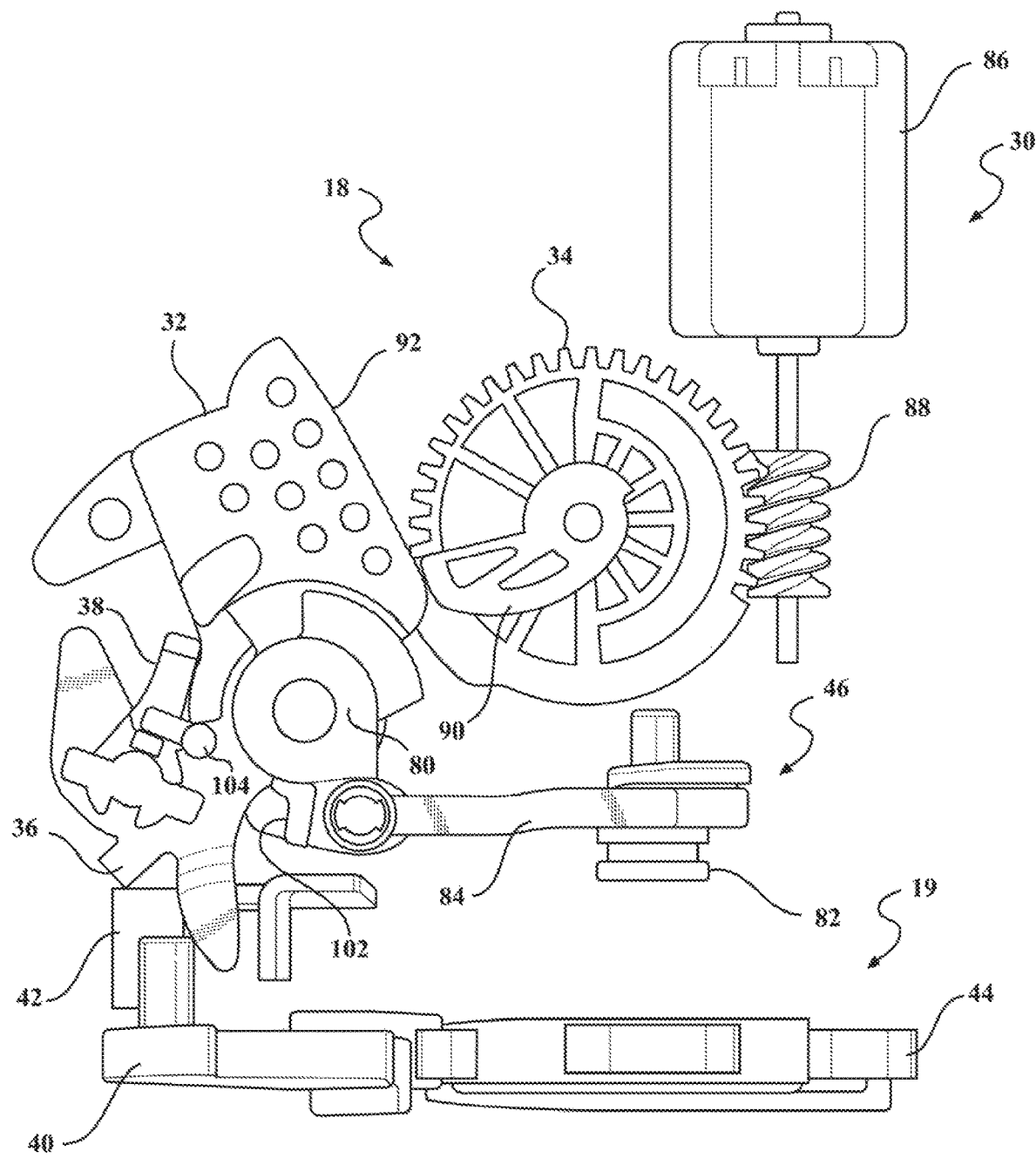
FIG. 9 is a side view of the power closure latch assembly of FIG. 2A shown in the power loss, door closed, power actuator release and striker capture position.
Figure 9A:
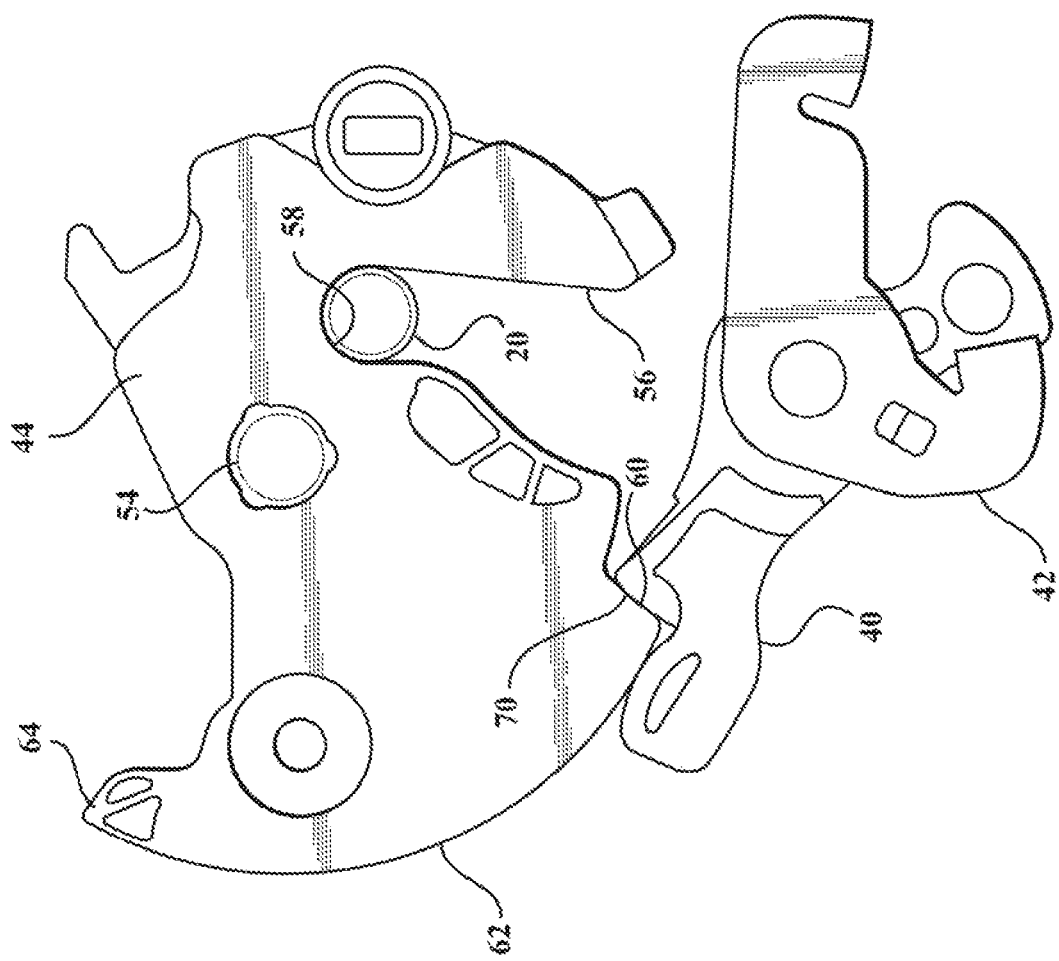
FIG. 9A is a partial cross-sectional, elevational view of components of the assembly as shown in FIG. 9.
Figure 11:
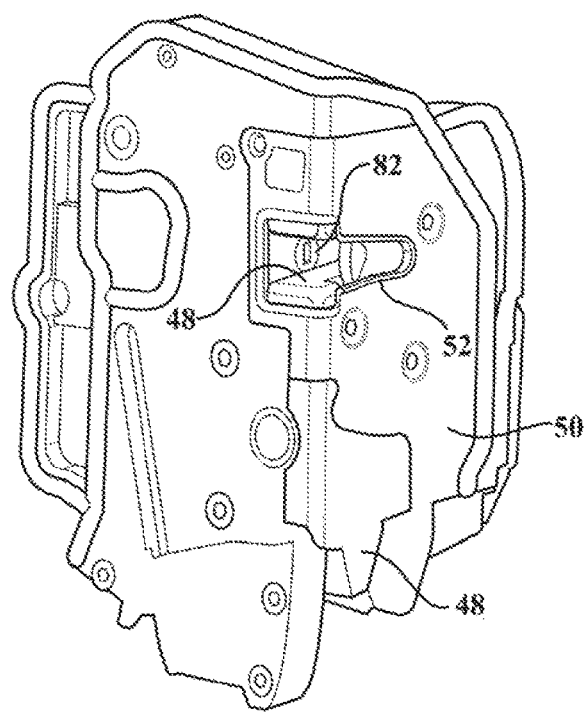
FIG. 11 is a partial perspective view of a power closure latch assembly housing illustrating the manually actuatable override/reset feature of the power closure latch assembly thereof.
Figure 11A:
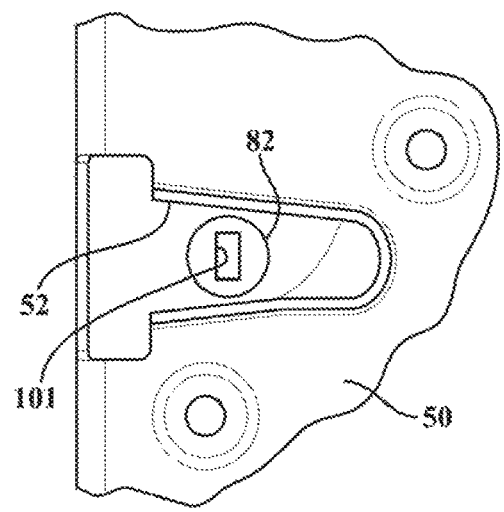
FIG. 11A is an elevation view illustrating the manually actuatable override/reset feature of FIG. 11.
Figure 11B:
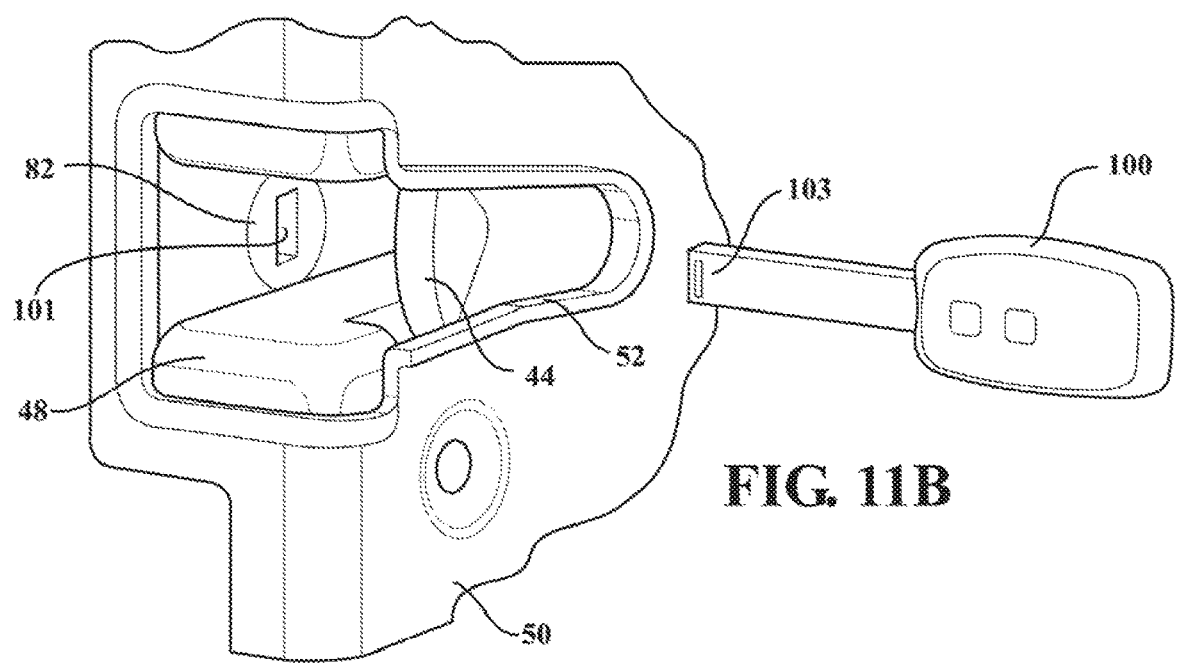
FIG. 11B is an enlarged view similar to FIG. 11 showing a vehicle key for actuating the manually actuatable override/reset feature.

As shown in FIGS. 7 and 7A, in the event the latch shoulder 70 of pawl 40 is unable to return into biased abutment with the cam surface 62 of ratchet 44 (and also latch shoulder 70 on pawl 40 is unable to return into biased abutment and engagement with closing notch 60 when ratchet 44 is located in its striker capture position) during a power interruption, as discussed above, the override/reset feature 46 can be manually activated to bypass the power release actuator 30. As shown in FIG. 11B, a vehicle key 100 can be inserted through the entry aperture 52 and into a receptacle 101 (illustratively a corresponding sized slot to receive the tip 103 of the vehicle key 100) of the backup actuation lever 82, whereupon the vehicle key 100 can be rotated to pivot the backup actuation lever 82 illustrated as arrow B and cause conjoint and concurrent movement of the backup link arm 84 and backup release lever 80 along the directions of arrows A, A' (FIG. 7), respectively, which brings a drive lug 102 of backup release lever 80 into driving engagement with a driven lug 104 of release lever link 38, thus, causing the release lever link 38 to be pivoted against the biasing member 78 relative to release lever 36 and outwardly from bridging engagement between the actuator lever 32 and release lever 36. It is recognized that backup link arm 84 may be configured such that a different action of the key 100 may impart a movement of backup link arm 84 in direction A, key 100 may push backup actuation lever 82 to urge backup link arm 84 in direction A, a bias such as a spring being further provided to urge backup link arm 84 in the direction opposite direction A when not engaged with the key 100. Backup actuation lever 82 is accessible through an access port or aperture 27 in the housing face 50b and/or frame plate 48. When power closure latch assembly 18 is mounted to the vehicle door 12, access port 27 is aligned with a panel access port or aperture 127 provided on the inner panel 31, illustratively shown as being aligned along a common axis A1 (See FIG. 14). As such, as shown in FIGS. 8 and 8A, with the release lever link 38 moved from between the actuator lever 32 and release lever 36, the release lever 36 is free to pivot under the bias of biasing member 76, thereby allowing the pawl lever 42 and pawl 40 to pivot under their respective biasing members 74, 72 to bring the latch shoulder 70 into biased engagement with the cam surface 62 of ratchet 44. Thus, when the ratchet 44 is pivoted against the bias of ratchet biasing member 66 via forced engagement with striker 20 during a door closing event, as shown in FIGS. 9 and 9A, the latch shoulder 70 of pawl 40 is able to move into locked engagement with the closing notch 60 of ratchet 44, thereby maintaining the ratchet 44 in the striker capture "hard closed" position. As can be seen, this occurs even though the cam lobe 90 is preventing the return of actuator lever 32 due to the power interruption. It is recognized that other tools other than the vehicle key 100 may be used to engage receptacle 101.

Figure 10:
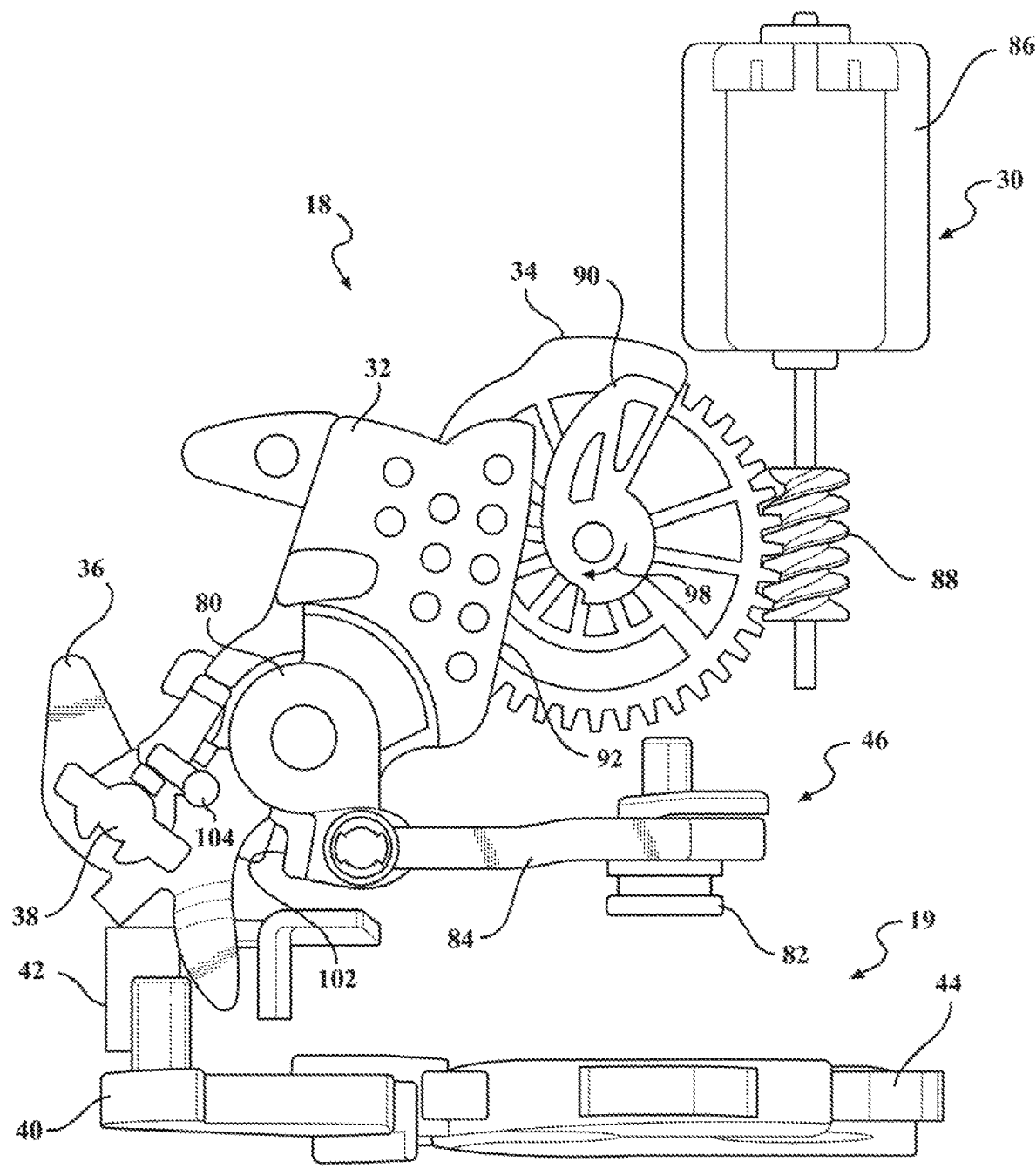
FIG. 10 is a side view of the power closure latch assembly of FIG. 2A shown in a power restored, door closed, power actuator rest and striker capture position.

Then, as shown in FIGS. 10 and 10A, upon the restoration of power to the power release actuator 30, the motor 86 is able to drive the drive worm shaft 88 to cause the gear 34 and cam lobe 90 to rotate in the second locking, latching direction 98, thereby causing the actuator lever 32 to return under the bias of a biasing member, thereby allowing the simultaneous return of release lever 36, which then allows the release lever link 38 to return under the bias of biasing member 78 to its "normal" bridging relation between the actuator lever 32 and release lever 36.

Figure 12:
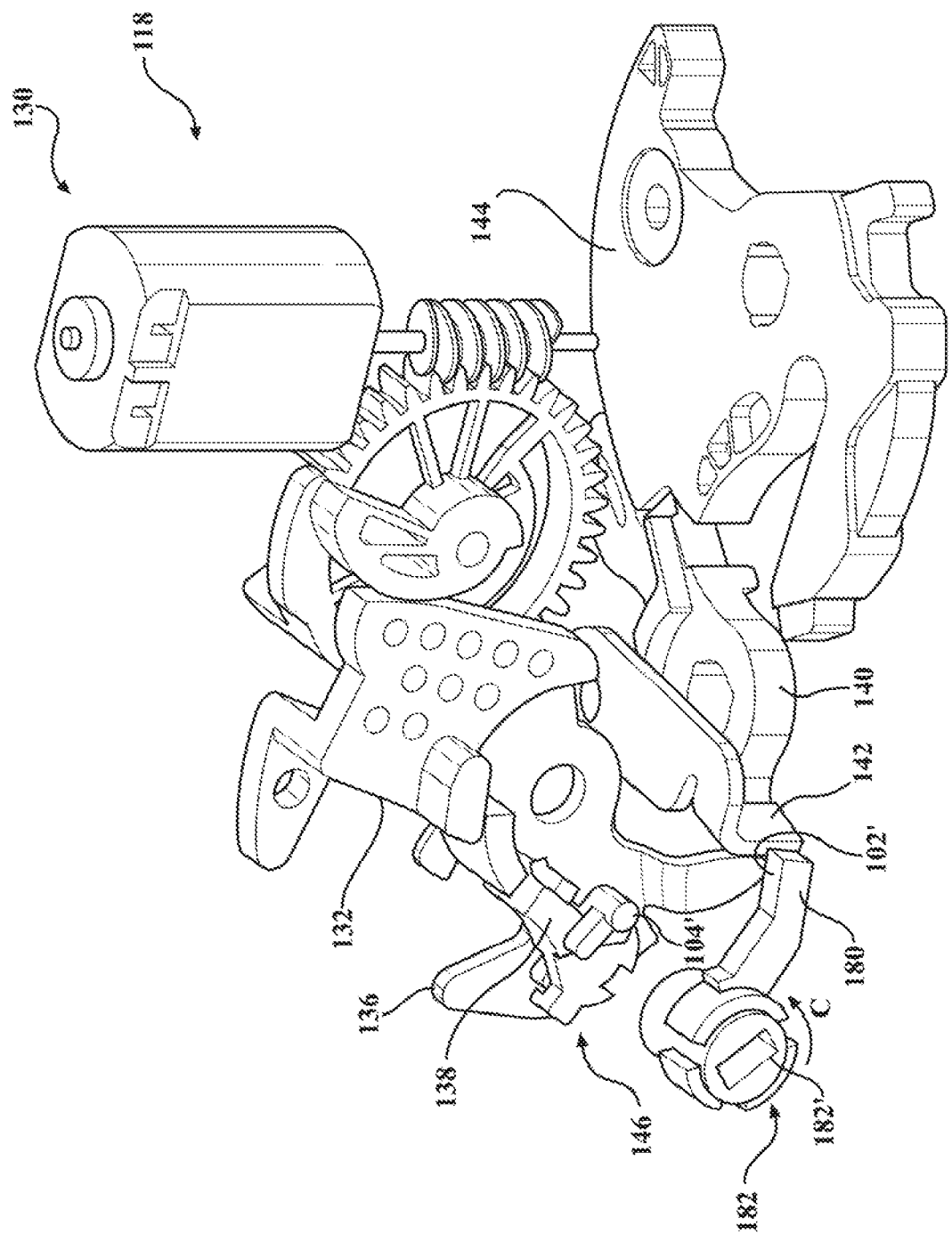
FIG. 12 is an isometric view similar to FIG. 2A of a power closure latch assembly in accordance with another aspect of the present disclosure.
Figure 13A:
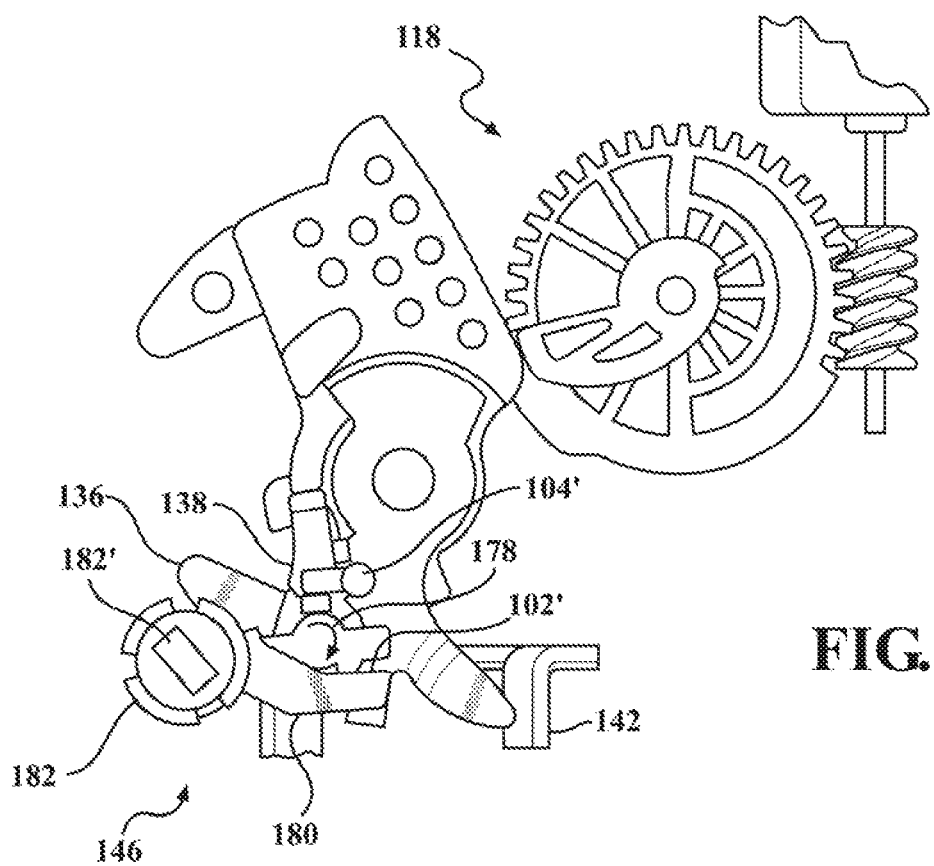
FIG. 13A illustrates the power closure latch assembly of FIG. 12 in a door open, power actuator release and striker release position, similar to FIG. 6.
Figure 13B:
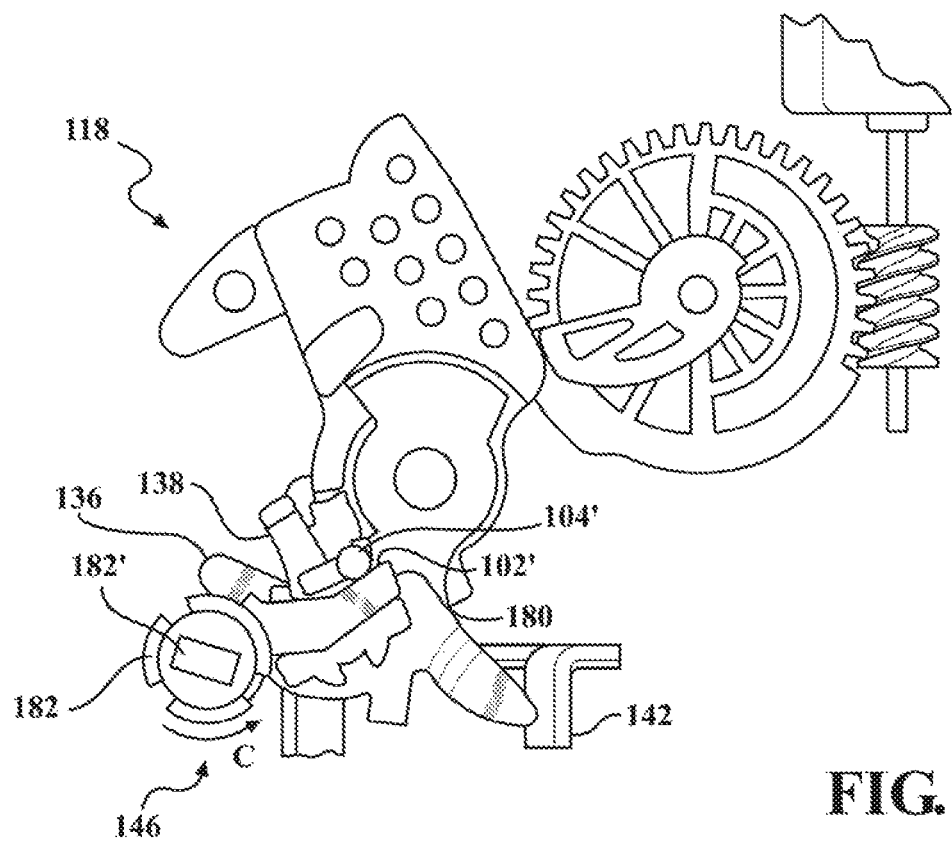
FIG. 13B illustrates the power closure latch assembly of FIG. 12 in a power loss, door open, power actuator release and striker release position with a manually actuatable override/reset feature of the assembly shown in an activated override/reset state, similar to FIG. 7.
Figure 13C:
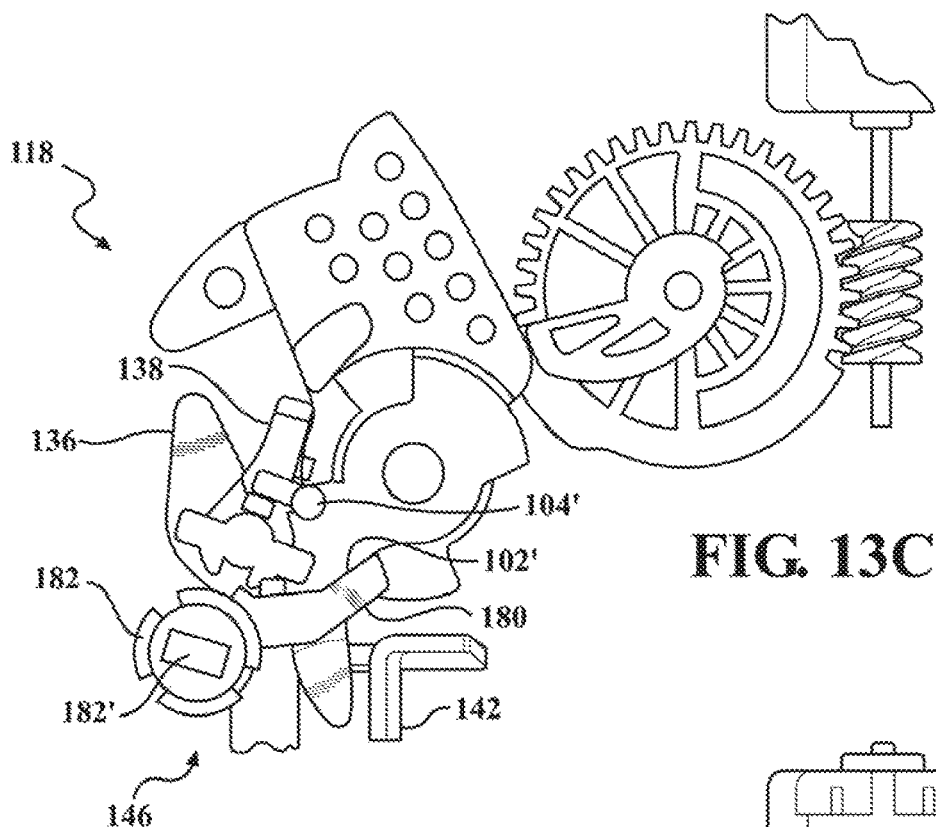
FIG. 13C illustrates the power closure latch assembly of FIG. 12 in the power loss, door closed, power actuator release and striker release position with the release lever and pawl lever shown freely biased back to a rest position with the manually actuatable override/reset feature shown returned to a deactivated rest state, similar to FIG. 9.
Figure 13D:
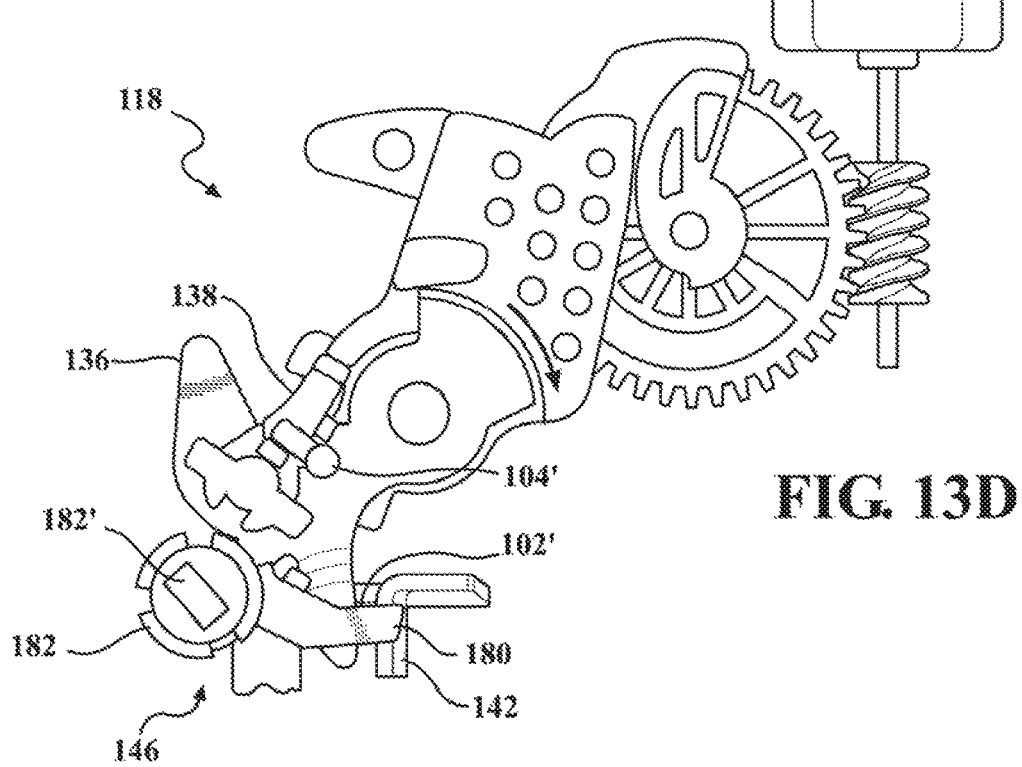
FIG. 13D illustrates the power closure latch assembly of FIG. 12 in a power restored, door closed, power actuator rest and striker capture position, similar to FIG. 10.

In FIG. 12, a power closure latch assembly 118 is shown in accordance with another aspect of the disclosure, with the same reference numerals as used above, offset by a factor of 100, being used to identify like features. Many of the components of the power closure latch assembly 118 are the same or substantially the same as discussed above for power closure latch assembly 18, including a power driven actuator 130; an actuator lever 132 configured in operable communication with the power driven actuator 130; a release lever 136 configured in operable communication with a pawl 140 via a pawl lever 142, the release lever 136 being biased away from pawl release lever 142 and pawl 140, wherein the pawl 140 is selectively moveable via an override/reset feature 146 from a ratchet releasing position back to a ratchet holding position, thereby allowing a ratchet 144 to be maintained in the striker capture position by pawl 140 and the vehicle closure panel 16 to be locked in the closed position in the absence of power to the power closure latch assembly 18. Thus, the discussion hereafter is largely limited to some notable differences, particularly with regard to orientation of the components respective to one another and the override/reset feature 146 of power closure latch assembly 118.

The override/reset feature 146 is shown without a separate backup release lever and a backup link arm, but rather, simply includes a combination backup actuation/release lever 182 which serves to function as both a backup actuation lever and backup release lever, as discussed above. As such, the backup actuation/release lever 182 has an actuation portion 182' and a release lever portion 180 having a drive lug 102' configured for operable engagement, such as direct engagement with a driven lug 104' of a release lever link 138, which is configure as discussed above for release lever link 38, thus, being biased by a release lever link spring member 178 toward a "normal" first position. A further notable distinction is with regard to special orientation of components, wherein the override/reset feature 146 lies along a plane transverse to the plane along which the backup actuation lever 82 lies, such that the backup actuation/release lever 182 and actuation portion 182' thereof lie along a plane transverse to the plane of ratchet 144. Backup actuation/release lever 182 is accessible through a port 25 in the frame plate 48 along a plane transverse to the plane of ratchet 144 to allow tip 103 to engage actuation/release lever 182. Backup actuation/release lever 182 and port 25 illustratively both being aligned along axis A2 (see FIG. 14). A fishmouth port 125 aligned with port 25 formed in the shut face 16A, illustrated as the being also aligned with entry aperture 52 allows the key 100 to engage the actuation/release lever 182 through the shut face 16A sheet metal. As such, access to backup actuation/release lever 182 and actuation portion 182' can be provided from within a cabin of the vehicle. For example, a matching port or aperture 33 provided within the inner panel 31 and optionally interior trim portion 35 may be provided so that the vehicle key 100 may pass there through and into engagement with the actuation portion 182' to impart a rotation of the actuation portion 182' in a direction shown as arrow C. In another embodiment, the actuation portion 182' may be accessible from within the interior vehicle 37 compartment directly through an access port in the housing or frame plate 48. A person skilled in the art would recognize that different orientations of the backup actuation/release lever 82, 182 may be provided depending on the angle of access of the vehicle key 100 into engagement therewith, or to facilitate interactions with an inside or outside release levers.

Function of the override/reset feature 146 is generally similar to that discussed above for override/reset feature 46, with various stages of operation shown in FIGS. 13A-13D. In summary, FIG. 13A corresponds to the description for FIGS. 6 and 6A, FIG. 13B corresponds to the description for FIGS. 7 and 7A, FIG. 13C corresponds to the description for FIGS. 8 and 8A, and FIG. 13D corresponds to the description for FIGS. 10 and 10A, with one skilled in the art readily appreciating the selective manual actuation of override/reset feature 146, such a via the vehicle key 100, without need of further description.

In accordance with another aspect of the disclosure, and with reference to FIG. 15, a method 1000 of allowing a power actuatable closure latch assembly 18, 118 to be converted for selective manual actuation during a power interruption to the power actuatable closure latch assembly 18, 118 is provided. The method 1000 includes providing 1002 a ratchet 44, 144 being moveable between a striker release position and a striker capture position. Further, providing 1004 a pawl 40, 140 being moveable between a ratchet holding position to hold the ratchet 44, 144 in the striker capture position and a ratchet releasing position to permit movement of the ratchet 44, 144 to the striker release position. Providing 1006 a power driven actuator 30, 130 and providing 1008 an actuator lever 32, 132 configured in operable communication with the power driven actuator 30, 130. Further, providing 1010 a release lever 36, 136 configured in operable communication with the pawl 40, 140, and providing 1012 a release lever link 38, 138 operably communicating the actuator lever 32, 132 with the release lever 36, 136 when the release lever link 38, 138 is in a "normal" first position to provide concurrent movement between the actuator lever 32, 132 and the release lever 36, 136 and to provide power-assisted movement of the pawl 40, 140 between the ratchet holding position and the ratchet releasing position in response to selective actuation of the power driven actuator 30, 130, and to allow the release lever link 38, 138 to be manually deployed to an "override/reset" second position whereat the release lever link 38, 138 is moved out of communication between the actuator lever 32, 132 and the release lever 36, 136 to allow the release lever 36, 136 to move independently from the actuator lever 32, 132, thereby allowing the pawl 40, 140 to move under manual actuation from the ratchet releasing position back to the ratchet holding position.

In accordance with a further aspect, the method can further include providing a backup actuation lever 82, 182 operably coupled to the release lever link 38, 138, either directly or indirectly, such as via an intervening link arm 84, and configuring the backup actuation lever 82, 182 for receipt of a vehicle key 100 such that rotation of the vehicle key 100 causes the release lever link 38, 138 to move from the "normal" first position to the "override/reset" second position.

In accordance with a further aspect, the method can further include biasing the release lever link 38, 138 toward the "normal" first position to allow the release lever link 38, 138 to be automatically returned to the "normal" first position from the "override/reset" second position upon power being restored to the power driven actuator 30, 130.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A closure latch assembly for use with a closure panel in a motor vehicle, comprising:
   a ratchet moveable between a striker release position whereat the ratchet is positioned to release a striker and a striker capture position whereat the ratchet is positioned to retain the striker, the ratchet being biased toward the striker release position;
   a pawl moveable between a ratchet holding position whereat the pawl is positioned to hold the ratchet in the striker capture position and a ratchet releasing position whereat the pawl is located to permit movement of the ratchet to the striker release position, the pawl being biased toward the ratchet holding position;
   a power driven actuator;
   an actuator lever configured in operable communication with the power driven actuator;
   a release lever configured in operable communication with said pawl, the release lever being biased away from said pawl;
   a pawl lever disposed between the release lever and the pawl, the pawl lever being biased by a pawl lever spring to impart the bias on the pawl toward the ratchet holding position; and
   a release lever link configured to operably communicate the actuator lever with the release lever when the release lever link is in a "normal" first position to provide conjoint movement between the actuator lever and the release lever and to provide power-assisted movement of the pawl between the ratchet holding position and the ratchet releasing position in response to selective actuation of the power driven actuator, and to allow the release lever to move independently from the actuator lever when the release lever link is in a manually deployed "override/reset" second position to allow movement of the pawl from the ratchet releasing position back to the ratchet holding position.

2. The closure latch assembly of claim 1, further including a release lever link spring member biasing the release lever link toward the "normal" first position.

3. The closure latch assembly of claim 2, further including a backup release lever configured in operable communication with the release lever link to move the release lever link from the "normal" first position to the "override/reset" second position.

4. The closure latch assembly of claim 3, wherein the backup release lever is configured for manual actuation independent from the power driven actuator to move the release lever link from the "normal" first position to the "override/reset" second position via a vehicle key.

5. The closure latch assembly of claim 4, further including a backup actuation lever operably coupled to the backup release lever, the backup actuation lever being configured for receipt of the vehicle key and for rotation in response to rotation of the vehicle key, wherein rotation of the backup actuation lever causes pivotal movement of the backup release lever into abutment with the release lever link to move the release lever link from the "normal" first position to the "override/reset" second position.

6. The closure latch assembly of claim 5, further including a link arm extending between the backup release lever and the backup actuation lever and being pivotably coupled to the backup release lever to move the release lever link against the bias of the release link spring member from the "normal" first position to the "override/reset" second position in response to rotation of the vehicle key.

7. The closure latch assembly of claim 6, wherein the backup release lever is supported for pivotal movement on the actuator lever.

8. The closure latch assembly of claim 6, wherein the link arm is configured for linear movement to cause the pivotal movement of the backup release lever in response to rotation of the vehicle key.

9. The closure latch assembly of claim 1, further including a gear member operatively coupled to the power driven actuator, the gear member having a cam lobe configured for abutment with the actuator lever to pivot the actuator lever and move the pawl between the ratchet holding position and the ratchet releasing position in response to selective actuation of the power driven actuator.

10. The closure latch assembly of claim 1, wherein movement of the release lever link from the "normal" first position to the "override/reset" second position allows a return movement of the release lever and the pawl from the ratchet releasing position back to the ratchet holding position.

11. A closure panel for a motor vehicle, comprising:
    an outer panel and an inner panel with a shut face extending therebetween; and
    a power closure latch assembly mounted along the shut face, the power closure latch assembly including a ratchet moveable between a striker release position whereat the ratchet is positioned to release a striker to allow the closure panel to be opened and a striker capture position whereat the ratchet is positioned to retain the striker to maintain the closure panel in a closed position, wherein the ratchet is biased toward its striker release position;
    a pawl moveable between a ratchet holding position whereat the pawl holds the ratchet in its striker capture position and a ratchet releasing position whereat the pawl permits movement of the ratchet to its striker release position, with the pawl being biased toward the ratchet holding position;
    a power driven actuator and an actuator lever configured in operable communication with the power driven actuator;
    a release lever configured in operable communication with the pawl, with the release lever being biased away from the pawl;
    a release lever link configured to bridge the actuator lever and the release lever to operably communicate the actuator lever with the release lever when the release lever link is in a "normal" first position to provide concurrent movement between the actuator lever and the release lever and to provide power-assisted movement of the pawl between the ratchet releasing position and the ratchet holding position in response to selective actuation of the power driven actuator, and to allow the release lever to move independently from the actuator lever when the release lever link is in a manually deployed "override/reset" second position to allow movement of the pawl from the ratchet releasing position back to the ratchet holding position;

a backup release lever configured in operable communication with the release lever link to move the release lever link from the "normal" first position to the "override/reset" second position; and a backup actuation lever operably coupled to the backup release lever, the backup actuation lever being accessible from the shut face.

12. The closure panel of claim 11, wherein the backup release lever is configured for manual actuation independent from the power driven actuator to move the release lever link from the "normal" first position to the "override/reset" second position via a vehicle key.

13. The closure panel of claim 12, wherein the backup actuation lever is operably coupled to the backup release lever, the backup actuation lever being configured for receipt of the vehicle key and for rotation in response to rotation of the vehicle key, wherein rotation of the backup actuation lever causes pivotal movement of the backup release lever into abutment with the release lever link to move the release lever link from the "normal" first position to the "override/reset" second position.

14. The closure panel of claim 13, further including a link arm extending between the backup release lever and the backup actuation lever and being pivotably coupled to the backup release lever to move the release lever link against the bias of the release link spring member from the "normal" first position to the "override/reset" second position in response to rotation of the vehicle key.

15. The closure panel of claim 14, wherein the backup release lever is supported for pivotal movement on the actuator lever.

16. The closure panel of claim 14, wherein the link arm is configured for linear movement to cause the pivotal movement of the backup release lever in response to rotation of the vehicle key.

17. A method of allowing a power actuatable closure latch assembly to be converted for selective manual actuation during a power interruption to the power actuated latch assembly, comprising:

providing a ratchet being moveable between a striker release position and a striker capture position;

providing a pawl being moveable between a ratchet holding position to hold the ratchet in the striker capture position and a ratchet releasing position to permit movement of the ratchet to the striker release position;

providing a power driven actuator;

providing an actuator lever configured in operable communication with the power driven actuator;

providing a release lever configured in operable communication with the pawl;

providing a release lever link operably communicating the actuator lever with the release lever when the release lever link is in a "normal" first position to provide concurrent movement between the actuator lever and the release lever and to provide power-assisted movement of the pawl between the ratchet holding position and the ratchet releasing position in response to selective actuation of the power driven actuator;

allowing the release lever link to be manually deployed to an "override/reset" second position whereat the release lever link is moved out of communication between the actuator lever and the release lever to allow the release lever to move independently from the actuator lever, thereby allowing the pawl to move under manual actuation from the ratchet releasing position back to the ratchet holding position;

providing a backup actuation lever operably coupled to the release lever link and configuring the backup actuation lever for receipt of a vehicle key such that rotation of the vehicle key causes the release lever link to move from the "normal" first position to the "override/reset" second position; and biasing the release lever link toward the "normal" first position to allow the release lever link to be automatically returned to the "normal" first position from the "override/reset" second position upon power being restored to the power driven actuator.

18. The method of claim 17, wherein movement of the release lever link from the normal first position to the override/reset second position allows a return movement of the release lever and the pawl from the ratchet releasing position back to the ratchet holding position.

19. A closure latch assembly for use with a closure panel in a motor vehicle, the closure latch assembly comprising:

a ratchet moveable between a striker release position whereat the ratchet is positioned to release a striker and a striker capture position whereat the ratchet is positioned to retain the striker, the ratchet being biased toward the striker release position;

a pawl moveable between a ratchet holding position whereat the pawl is positioned to hold the ratchet in the striker capture position and a ratchet releasing position whereat the pawl is located to permit movement of the ratchet to the striker release position, the pawl being biased toward the ratchet holding position;

a power driven actuator:

an actuator lever configured in operable communication with the power driven actuator;

a gear member operatively coupled to the power driven actuator, the gear member having a cam lobe configured for abutment with the actuator lever to pivot the actuator lever and move the pawl between the ratchet holding position and the ratchet releasing position in response to selective actuation of the power driven actuator;

a release lever configured in operable communication with the pawl, the release lever being biased away from the pawl; and a release lever link configured to operably communicate the actuator lever with the release lever when the release lever link is in a "normal" first position to provide conjoint movement between the actuator lever and the release lever and to provide a power-assisted movement of the pawl between the ratchet holding position and the ratchet releasing position in response to selective actuation of the power driven actuator, and to allow the release lever to move independently from the actuator lever when the release lever link is in a manually deployed "override/reset" second position to allow movement of the pawl from the ratchet releasing position back to the ratchet holding position.

* * * * *